(12) United States Patent
Kimura

(10) Patent No.: US 7,110,344 B2
(45) Date of Patent: Sep. 19, 2006

(54) OBJECTIVE LENS, OPTICAL PICKUP APPARATUS, AND RECORDING AND/OR REPRODUCING APPARATUS

(75) Inventor: Tohru Kimura, Hachioji (JP)

(73) Assignee: Konica Corporation, Tokyo (JP)

( * ) Notice: Subject to any disclaimer, the term of this patent is extended or adjusted under 35 U.S.C. 154(b) by 758 days.

(21) Appl. No.: 10/171,967

(22) Filed: Jun. 17, 2002

(65) Prior Publication Data

US 2003/0123372 A1 Jul. 3, 2003

(30) Foreign Application Priority Data

Jun. 20, 2001 (JP) ............................. 2001-185962

(51) Int. Cl.
*G11B 7/00* (2006.01)
(52) U.S. Cl. .............................. 369/112.23; 369/112.01
(58) Field of Classification Search ...................... None
See application file for complete search history.

(56) References Cited

U.S. PATENT DOCUMENTS 6,411,442 B1 * 6/2002 Ota et al. .............. 369/112.23
6,511,788 B1 * 1/2003 Yasuda et al. ........... 369/275.2
6,633,533 B1 * 10/2003 Kondo ..................... 369/275.1

* cited by examiner

*Primary Examiner*—Thang V. Tran
(74) *Attorney, Agent, or Firm*—Finnegan, Henderson, Farabow, Garrett & Dunner, L.L.P.

(57) ABSTRACT

An objective lens for recording and/or reproducing information of an optical information recording medium, comprises at lest one aspherical surface. The objective lens is a single lens and satisfies the following formulas:

$0.85 < NA < 0.98$ $0.80 < d/f < 3.00$ $0.5 < \Phi 1 < 5.8$ where
NA is an optical information recording medium side numerical aperture,
d is a thickness (mm) on an optical axis,
f is a focal length (mm) for an object locating at an infinite distance, and
$\Phi 1$ is an effective diameter (mm) of a light source side surface.

20 Claims, 20 Drawing Sheets

EXAMPLE 1

EXAMPLE 1

SPHERICAL ABERRATION, SINE CONDITION

EXAMPLE 2

EXAMPLE 3

EXAMPLE 4

EXAMPLE 5

EXAMPLE 6

EXAMPLE 7

EXAMPLE 7

NA0.90

SA

SC

-0.01   -0.005   0   0.005   0.01 (mm)

SPHERICAL ABERRATION, SINE CONDITION

EXAMPLE 8

EXAMPLE 9

OBJECTIVE LENS, OPTICAL PICKUP APPARATUS, AND RECORDING AND/OR REPRODUCING APPARATUS

BACKGROUND OF THE INVENTION

The present invention relates to an objective lens for recording and/or reproduction of information for an optical information recording medium, an optical pickup device including the objective lens, and a recording/reproduction apparatus including the optical pickup device.

Novel high density recording optical pickup systems each employing a light source such as a violet semiconductor laser or a violet SHG laser having an oscillation wavelength of about 400 nm and an objective lens whose numerical aperture is raised up to about 0.85 are under studies and developments recently. It is known that the recording density of an optical recording medium such as an optical disk and a magneto-optic disk grows greater in inverse proportion to an area of a spot formed on an information recording surface through light-converging by an objective lens ($=k \cdot (\lambda/NA)^2$), wherein k represents a proportion constant, $\lambda$ is a wavelength of a light source and NA represents a numerical aperture of the objective lens). Though a method to achieve high density of an optical recording medium includes a method to shorten a wavelength of a light source, in addition to a method to make a numerical aperture of an objective lens to be higher, the method to shorten a wavelength of a light source has a problem that it is impossible to obtain the light utilization efficiency that is practically sufficient, because internal transmittance of a lens material falls sharply in an area of the wavelength shorter than 350 nm. It is therefore estimated that an objective lens is required to have the numerical aperture that is further higher, for higher density in a novel optical pickup system.

Though the high density recording optical pickup system mentioned above is equipped with a two-group-structured objective lens, an increase of man-hour for assembling a first lens and a second lens, deterioration of production efficiency and a cost increase are caused, because eccentricity tolerance between lenses is small in the two-group-structured objective lens having high NA.

Further, since depth of focus d of the objective lens is in inverse proportion to a square of the numerical aperture, the greater the numerical aperture is, the smaller the depth of focus is, and the speed of response and accuracy required for an actuator for focusing of the objective lens become higher increasingly. Since a two-group-structured objective lens is greater than a single lens in terms of weight, it causes a large-sized actuator and an increase of cost.

Further, an working distance of the two-group-structured objective lens having high NA tends to be small, compared with a single lens. In the design of an objective lens with high NA, security of sufficient working distance is an importance matter in a sense of preventing damages of an optical recording medium.

From the foregoing, it is preferable that the objective lens with high NA is a single lens which does not require assembling while is light in weight and makes it possible secure a sufficient working distance.

Incidentally, in the case of an aspherical single lens for recording and/or reproduction for an optical recording medium, spherical aberration and coma are corrected by an aberration correcting action of an aspheric surface, but when NA grows greater, astigmatism as wavefront aberration grows greater and image height characteristics are deteriorated, which is a problem.

When the depth of focus of the objective lens becomes smaller, defocus component generated when instantaneous wavelength variation which cannot be traced by focusing of the objective lens takes place on the light source, grows greater. It is therefore necessary to correct chromatic aberration more strictly when the numerical aperture grows greater.

An object of the invention is to provide an aspherical single objective lens for recording and/or reproduction of information for an optical information recording medium wherein the numerical aperture is made to be greater than 0.85, and image height characteristics are excellent.

Another object is to provide an aspherical single objective lens which is suitable to be used for a high density optical pickup apparatus employing a light source whose wavelength is as short as about 400 nm, and has a numerical aperture that is made to be greater than 0.85.

Further object is to provide an aspherical single objective lens having a numerical aperture greater than 0.70 wherein image height characteristics are excellent, a working distance is secured sufficiently, and a weight is less.

SUMMARY OF THE INVENTION

Still further object is to provide an optical pickup device equipped with the objective lens mentioned above and a recording/reproducing apparatus.

To attain the object stated above, the first objective lens of the invention is an objective lens for recording and/or reproduction of information for an optical information recording medium, and the objective lens is a single lens wherein at least one surface is an aspheric surface, and NA representing a numerical aperture of the objective lens on the optical information recording medium side, d (mm) representing a thickness on an optical axis, f (mm) representing a focal length for an object at an infinite distance and $\Phi 1$ (mm) representing an effective diameter of the surface on the light source side respectively satisfy the following expressions (1), (2) and (3).

$$0.85 < NA < 0.98 \quad (1)$$

$$0.80 < d/f < 3.00 \quad (2)$$

$$0.5 < \Phi 1 < 5.8 \quad (3)$$

In the objective lens mentioned above, it is possible to make a size of a spot formed on an information recording surface through light-converging by enhancing the numerical aperture (NA) of the prescribed objective lens necessary for conducting recording and/or reproduction for an optical information recording medium to 0.85 or more, which makes high density recording and/or reproduction of information recorded at high density possible for the optical information recording medium. Further, it is possible to correct spherical aberration and coma satisfactorily, by making at least one surface to be an aspheric surface. In this case, it is preferable that the surface on the light source side is made to be an aspheric surface, because various aberrations are corrected satisfactorily accordingly. Further, by employing a single lens, improvement of productivity and cost reduction can be attained because incorporating and adjustment become unnecessary.

It is preferable that the first objective lens of the invention satisfies expression (1), and the expression (1) shows appropriate conditions for thickness d on an optical axis of the lens and for focal length f, for obtaining excellent image height characteristics in a single lens having NA greater than 0.85, and when NA is not less than the lower limit, the third-order astigmatism component in evaluation of image height characteristics by wavefront aberration is not too great, and coma component at high-order of fifth-order or higher is not too great. When the upper limit of the expression (1) is not exceeded, the third-order spherical aberration component in evaluation of image height characteristics by wavefront aberration is not too great, a fifth-order astigmatism component is not too great, third-order coma component is not too great, and an astigmatic difference is not too great.

Further, when the upper limit of expression (2) is not exceeded, a thickness of the lens on its optical axis is not too great, thereby, the lens can be made light in weight to be driven by a small-sized actuator. Further, when the upper limit of expression (2) is not exceeded, a working distance can be secured sufficiently, because a thickness of the lens on its optical axis is not too great. To attain the aforesaid effect, it is preferable to satisfy the following expression (2').

$$1.10 \leq d/f \leq 1.90 \quad (2')$$

It is further preferable that the first objective lens of the invention satisfies expression (3). Compared with an objective lens used for a conventional optical pickup for CD and DVD having relatively low NA, an objective lens having high NA tends to have a small working distance. However, the working distance can be secured, if an aperture of the objective lens is made to be large. In that case, however, a large-sized actuator and an increase in cost are caused because a weight of the objective lens grows greater. Therefore, the upper limit of a diameter of the light flux entering the surface of the objective lens on the light source side in the invention has been determined as shown in expression (3).

Further, the second objective lens of the invention is an objective lens for recording and/or reproduction of information for an optical information recording medium, and the objective lens is characterized to be a single lens wherein at least one surface is an aspheric surface, and to satisfy the following expressions (4), (5) and (6).

$$0.80 < d/f < 3.00 \quad (4)$$

$$0.47 < (X1-X2) \cdot (n-1)/(NA \cdot f \cdot \sqrt{(1+|m|)}) < 0.80 \quad (5)$$

$$0.5 < \Phi 1 < 5.8 \quad (6)$$

In the above expressions, d represents a thickness (mm) of the objective lens on its optical axis, X1 represents a difference (mm) in the optical axis direction between a plane that is tangential to the vertex of the surface that is perpendicular to the optical axis and is positioned on the light source side and the surface on the light source side on the outermost peripheral edge of the effective diameter (position on the surface on the light source side where a marginal ray of the NA enters), and when the difference is measured toward an optical information recording medium from the reference of the tangential plane, its sign is positive, and when measured toward the light source, a sign is negative, X2 represents a difference (mm) in the optical axis direction between a plane that is tangential to the vertex of the surface that is perpendicular to the optical axis and is positioned on the light source side and the surface on the optical information recording medium side on the outermost peripheral edge of the effective diameter (position on the surface on the optical information recording medium side where a marginal ray of the NA enters), and when the difference is measured toward an optical information recording medium from the reference of the tangential plane, its sign is positive, and when measured toward the light source, a sign is negative, n represents a refractive index of the objective lens at the wavelength of the light source, f represents a focal length (mm) of the objective lens for an object at an infinite distance, m represents an image forming magnification of the objective lens, and $\Phi 1$ represents an effective diameter (mm) of the surface on the light source side.

In the second objective lens mentioned above, expression (5) is a conditional expression relating to an amount of sag for the surface on the light source side and the surface on the optical information recording medium side for correcting satisfactorily spherical aberration in a single lens whose NA is greater than 0.85. When a sign of X1 is positive and its absolute value is smaller and a sign of X2 is negative and its absolute value is smaller, an effect of excessive correction for spherical aberration of marginal rays is great, and when a sign of X1 is positive and its absolute value is greater and a sign of X2 is negative and its absolute value is greater, an effect of insufficient correction for spherical aberration of marginal rays is great. It is therefore necessary for (X1−X2) to be within a certain range for correction of spherical aberration From the foregoing, it is preferable that the second lens of the invention satisfies expression (5), and at the range equal to or higher than the lower limit, excessive correction of spherical aberration of marginal rays is avoided, and when the upper limit is not exceeded, insufficient correction of spherical aberration of marginal rays is avoided. To attain the aforesaid effect, it is preferable to satisfy expression (21) described later. It is further possible to obtain the same effect as in expressions (1) and (3).

Further, it is preferable that expression (7) is satisfied by the value of numerical aperture NA of the objective lens on the optical information recording medium side in the second objective lens.

$$0.70 < NA < 0.98 \quad (7)$$

The third objective lens of the invention is an objective lens for recording and/or reproduction of information for an optical information recording medium, and the objective lens is an objective lens for an optical pickup device having a light source with wavelength α and is a single lens wherein at least one surface is an aspheric surface, and numerical aperture NA of the objective lens on the optical information recording medium side and the wavelength λ satisfy the following expressions (8) and (9).

$$0.85 < NA < 0.98 \quad (8)$$

$$350 \text{ nm} < \lambda < 550 \text{ nm} \quad (9)$$

When the third objective lens of the invention is equipped on an optical pickup device using, as a light source, a single wavelength light source satisfying expression (9), it becomes possible to record on a high density basis and/or to reproduce information recorded on a high density basis both for an optical information recording medium. As such single wavelength light source, it is possible to use a semiconductor laser concerning nitride of an element of groups III to V in a periodic table such as GaN and SHG laser. It is further possible to obtain the same effect as in the expression (1).

Further, it is preferable that each of thickness d (mm) of the objective lens on its optical axis, focal length f (mm) for an object at an infinite distance and effective diameter $\Phi 1$ (mm) of the surface on the light source side satisfies the following expressions (10) and (11) respectively in the third objective lens.

$$0.80 < d/f < 3.00 \quad (10)$$

$$0.5 < \Phi 1 < 5.8 \quad (11)$$

The fourth objective lens of the invention is an objective lens for recording and/or reproduction of information for an optical information recording medium, and the objective lens is a single lens wherein at least one surface is an aspheric surface and a ring-shaped zonal diffractive structure is formed on at least one surface, and each of numerical aperture NA of the objective lens on the optical information recording medium side, thickness on optical axis d (mm) and focal length f (mm) for an object at an infinite distance satisfies the following expressions (12) and (13).

$$0.85 < NA < 0.98 \quad (12)$$

$$0.95 < d/f < 3.00 \quad (13)$$

A laser beam emitted from a semiconductor laser is generally of a single wavelength (single mode), and it is considered to be free from chromatic aberration. In practice, however, it sometimes brings about mode hopping in which a central wavelength skips instantaneously by several nanometers. As is known well, depth of focus d of the objective lens is expressed by $d \propto \lambda/(NA)^2$ ($\lambda$ is a wavelength of the light source and NA is a numerical aperture of the objective lens). Therefore, when NA grows greater, the depth of focus becomes smaller, and defocus caused by chromatic aberration created by mode hopping of the semiconductor laser becomes an allowable problem on the objective lens whose NA is greater than 0.85. Therefore, chromatic aberration of the objective lens needs to be corrected. Further, in the case of general optical materials, the shorter the wavelength is, the greater the change of refractive index caused by wavelength change is, thus, when using a semiconductor laser with a short wavelength, chromatic aberration is caused on the objective lens heavily by mode hopping. Since the depth of focus of the objective lens becomes smaller when the wavelength of a light source is shorter, even slight defocus is not allowed, and when a semiconductor laser with a short wavelength is used, the need for correction of chromatic aberration of the objective lens is increased more and more. As a method to correct chromatic aberration, there is available, for example, a method to make a doublet by cementing a positive lens having a relatively large Abbe's number and a negative lens having a relatively small Abbe's number. In this case, a weight of the objective lens grows greater, which is not preferable from the viewpoint of a load on an actuator for focusing.

When a ring-shaped zonal diffractive structure is provided on at least one surface as in the fourth objective lens, chromatic aberration can be corrected without increasing the number of lenses. It is further possible to obtain the same effect as in the expressions (1) and (2).

Further, it is preferable that the fourth objective lens is an objective lens for an optical pickup device having a light source with wavelength $\lambda$, and that wavelength $\lambda$ and effective diameter $\Phi 1$ (mm) satisfy the following expressions (14) and (15).

$$350 \text{ nm} < \lambda < 550 \text{ nm} \quad (14)$$

$$0.5 < \Phi 1 < 5.8 \quad (15)$$

The fifth objective lens of the invention is an objective lens for recording and/or reproduction of information for an optical information recording medium, and that objective lens is an objective lens for an optical pickup device having a light source with wavelength $\lambda$, and is a single lens wherein at least one surface is made to be an aspheric surface and a ring-shaped zonal diffractive structure is formed on at least one surface, and numerical aperture NA of the objective lens on the optical information recording medium side and a value of the wavelength $\lambda$ satisfy respectively the following expressions (16) and (17).

$$0.85 < NA < 0.98 \quad (16)$$

$$350 \text{ nm} < \lambda < 550 \text{ nm} \quad (17)$$

In the fifth objective lens, it is possible to correct chromatic aberration without increasing the number of lenses, by providing a ring-shaped zonal diffractive structure on at least one surface as described above. It is further possible to obtain the same effect as in the expressions (1) and (9).

Further, it is preferable that each of thickness d (mm) of the objective lens on its optical axis, focal length f (mm) for an object at an infinite distance and effective diameter $\Phi 1$ (mm) of the surface on the light source side satisfies the following expressions (18) and (19) respectively in the fifth objective lens.

$$0.80 < d/f < 3.00 \quad (18)$$

$$0.5 < \Phi 1 < 5.8 \quad (19)$$

Further, it is preferable that each of the first, third, fourth and fifth objective lenses satisfies the following expression (20).

$$0.40 < (X1-X2) \cdot (n-1)/(NA \cdot f \cdot \sqrt{(1+|m|)}) < 0.80 \quad (20)$$

In the above expression, X1 represents a difference (mm) in the optical axis direction between a plane that is tangential to the vertex of the surface that is perpendicular to the optical axis and is positioned on the light source side and the surface on the light source side on the outermost peripheral edge of the effective diameter (position on the surface on the light source side where a marginal ray of the NA enters), and when the difference is measured toward an optical information recording medium from the reference of the tangential plane, its sign is positive, and when measured toward the light source, a sign is negative, X2 represents a difference (mm) in the optical axis direction between a plane that is tangential to the vertex of the surface that is perpendicular to the optical axis and is positioned on the light source side and the surface on the optical information recording medium side on the outermost peripheral edge of the effective diameter (position on the surface on the optical information recording medium side where a marginal ray of the NA enters), and when the difference is measured toward an optical information recording medium from the reference of the tangential plane, its sign is positive, and when measured toward the light source, a sign is negative, n represents a refractive index of the objective lens at the wavelength of the light source, f represents a focal length (mm) of the objective lens for an object at an infinite distance, and m represents an image forming magnification of the objective lens.

Further, it is more preferable that each of the first—fifth objective lenses satisfies the following expression (21).

$$0.47 < (X1-X2) \cdot (n-1)/(NA \cdot f \cdot \sqrt{(1+|m|)}) < 0.75 \quad (21)$$

The sixth objective lens of the invention is an objective lens for recording and/or reproduction of information for an optical information recording medium, and the objective lens is a single lens wherein at least one surface is an aspheric surface, and each of numerical aperture NA of the objective lens on the optical information recording medium side, thickness on optical axis d (mm) and focal length f (mm) for an object at an infinite distance satisfies the following expressions (22) and (23) respectively.

$$0.70 < NA < 0.98 \quad (22)$$

$$0.80 < d/f < 1.35 \quad (23)$$

In the sixth objective lens, the expression (23) represents conditions for obtaining a light objective lens wherein image height characteristics are excellent and sufficient working distance is secured, in a single objective lens with high NA whose NA value satisfies expression (22), and for the lower limit of expression (23) or higher, the third-order astigmatism component in evaluation of image height characteristics by wavefront aberration is not too great, and coma component at high-order of fifth-order or higher is not too great. Further, an edge thickness of the lens can be secured sufficiently. When the upper limit of the expression (23) is not exceeded, the third-order spherical aberration component in evaluation of image height characteristics by wavefront aberration is not too great, a fifth-order astigmatism component is not too great, third-order coma component is not too great, and an astigmatic difference is not too great. Further, a sufficient working distance can be secured and a load on an actuator can be lightened because a volume of the lens does not become too large.

Further, it is preferable that the sixth objective lens satisfies the following expression (24).

$$0.35<(X1-X2)\cdot(n-1)/(NA\cdot f\cdot\sqrt{(1+|m|)})<0.70 \tag{24}$$

In the above expression, X1 represents a difference (mm) in the optical axis direction between a plane that is tangential to the vertex of the surface that is perpendicular to the optical axis and is positioned on the light source side and the surface on the light source side on the outermost peripheral edge of the effective diameter (position on the surface on the light source side where a marginal ray of the NA enters), and when the difference is measured toward an optical information recording medium from the reference of the tangential plane, its sign is positive, and when measured toward the light source, a sign is negative, X2 represents a difference (mm) in the optical axis direction between a plane that is tangential to the vertex of the surface that is perpendicular to the optical axis and is positioned on the light source side and the surface on the optical information recording medium side on the outermost peripheral edge of the effective diameter (position on the surface on the optical information recording medium side where a marginal ray of the NA enters), and when the difference is measured toward an optical information recording medium from the reference of the tangential plane, its sign is positive, and when measured toward the light source, a sign is negative, n represents a refractive index of the objective lens at the wavelength of the light source, f represents a focal length (mm) of the objective lens for an object at an infinite distance, and m represents an image forming magnification of the objective lens.

Further, it is more preferable that the sixth objective lens satisfies the following expression (25).

$$0.40<(X1-X2)\cdot(n-1)/(NA\cdot f\cdot\sqrt{(1+|m|)})<0.65 \tag{25}$$

The expression (24) in the sixth objective lens is a conditional expression relating to an amount of sag for the surface on the light source side and the surface on the optical information recording medium side for correcting satisfactorily spherical aberration in a high NA single objective lens whose NA value satisfies expression (22). When a sign of X1 is positive and its absolute value is smaller and a sign of X2 is negative and its absolute value is smaller, an effect of excessive correction for spherical aberration of marginal rays is great, and when a sign of X1 is positive and its absolute value is greater and a sign of X2 is negative and its absolute value is greater, an effect of insufficient correction for spherical aberration of marginal rays is great. It is therefore necessary for (X1-X2) to be within a certain range for correction of spherical aberration. From the foregoing, it is preferable that the sixth objective lens of the invention satisfies expression (24), and at the range equal to or higher than the lower limit, excessive correction of spherical aberration of marginal rays is avoided, and when the upper limit is not exceeded, insufficient correction of spherical aberration of marginal rays is avoided. To attain the aforesaid effect, it is preferable to satisfy expression (25).

Further, it is preferable that the sixth objective lens is an objective lens for an optical pickup device having a light source with wavelength λ, and that wavelength λ satisfies the following expression (26).

$$350\text{ nm}<\lambda<550\text{ nm} \tag{26}$$

Further, it is preferable that each of the first—sixth objective lenses is a single lens wherein both sides are aspherical.

Further, it is preferable that a value of paraxial radius of curvature r1 (mm) on the surface of each of the first-sixth objective lenses satisfies the following expression (27).

$$0.25<r1/(n\cdot f\cdot(1-|m|))<0.65 \tag{27}$$

The expression (27) is a conditional expression for correcting coma component of image height characteristics satisfactorily, and for the range equal to or higher than the lower limit of the expression (27), a high order area of the sine condition does not become to be under, and when the upper limit is not exceeded, a high order area of the sine condition does not become to be over. It is preferable to satisfy the following expression (27') to attain the effect stated above.

$$0.35<r1/(n\cdot f\cdot(1-|m|))<0.65 \tag{27'}$$

It is preferable that each of the first-sixth objective lenses is corrected in terms of spherical aberration corresponding to a thickness of a protective layer that protects an information recording surface of the optical information recording medium, and thickness t (mm) of the protective layer satisfies the following expression (28).

$$0.0 \leq t<0.15 \tag{28}$$

Expression (28) is a conditional expression concerning an appropriate thickness of the protective layer of the optical information recording medium for controlling coma generated by skewing of the optical information recording medium. When the numerical aperture of the objective lens is made to be greater than 0.85, it is possible to secure a skew margin that is equal to or more than that for conventional optical information recording medium such as CD and DVD, by making a thickness of the protective layer of the optical information recording medium to be smaller than 0.15 mm. If a thickness of the protective layer is zero, spherical aberration correction corresponding to the thickness of the protective layer that is zero may also be conducted for each objective lens of the invention, namely, spherical aberration may also be corrected only by the objective lens, because coma is not generated by disk skewing.

Further, owing to the first—sixth objective lenses which are made of optical plastic materials, a weight and inertia of the objective lens are small in spite of high NA, thus, a load on an actuator for focusing is reduced, and a position of the objective lens can be controlled more accurately by the actuator. As a result, it is possible to achieve reduction of focusing errors, a small-sized actuator and power saving for the actuator. Further, when it comes in contact with an optical information recording medium, damage of the optical information recording medium can be prevented. It is further possible to manufacture at low cost on a mass production basis through an injection molding method that employs a metal mold. As plastic materials, preferable materials are those wherein light transmittance for thickness 3 mm in an area of the wavelength used is 85% or more and percentage of saturated water absorption is 0.5% or less. As a plastic material like this, olefin resin is preferable, and norbornane resin among polyolefin resins is more preferable.

Further, when the first—sixth objective lenses are made of optical glass materials, it is possible to make an apparent angle of an aspheric surface of the surface on the light source side not to be sharp because a refractive index of the optical glass is high compared with that of an optical plastic, and a metal mold can be processed accurately. Since the optical glass is higher than the optical plastic in terms of environment-resistance, deterioration of image forming efficiency of the objective lens is less when environmental changes such as changes in temperature and humidity take place.

Each objective lens in the invention stated above may also be finite lens whose object point is at a finite distance without being limited to infinite lens whose object point is at an infinite distance. When correcting aberration so that aberration may be minimum for a collimated light flux from an object at an infinite distance, even when the objective lens is moved for reduction of tracking errors and focusing errors, a change in conditions for incidence to the objective lens is small, and a change in aberration is also small accordingly. When correcting aberration so that the aberration may be minimum for the divergent light flux from an object at a finite distance for the aforesaid objective lens, it is possible to prevent a collision between the objective lens and the optical information recording medium, because a sufficient working distance can be secured. When correcting aberration so that the aberration may be minimum for a light flux converging toward an object on the image side, it is possible to suppress aberration deterioration caused by eccentricity error in the course of manufacturing, and to make the objective lens to be manufactured easily, because an incident angle of a ray of light to the objective lens becomes small.

An optical pickup device in the invention is one provided with a light source and a light-converging optical system including an objective lens for converging a light flux emitted from the light source on an information recording surface of an optical information recording medium for conducting recording and/or reproduction of information for the optical information recording medium by detecting for receiving reflected light from the information recording surface, wherein either one of the first—sixth objective lenses is provided as the objective lens mentioned above.

This optical pickup device makes it possible conduct high density recording and reproduction by using a light source whose wavelength is as short as about 400 nm, by using an aspherical single objective lens whose numerical aperture is large and image height characteristics are excellent, and to secure a sufficient working distance.

The recording and reproducing apparatus of the invention is one that is equipped with the above-mentioned optical pickup device and conducts recording and/or reproducing for voices and/or images. This recording and reproducing apparatus can conduct high density recording and reproduction.

DETAILED DESCRIPTION OF THE PREFERRED EMBODIMENT (Example of the Invention)

Figure 1:
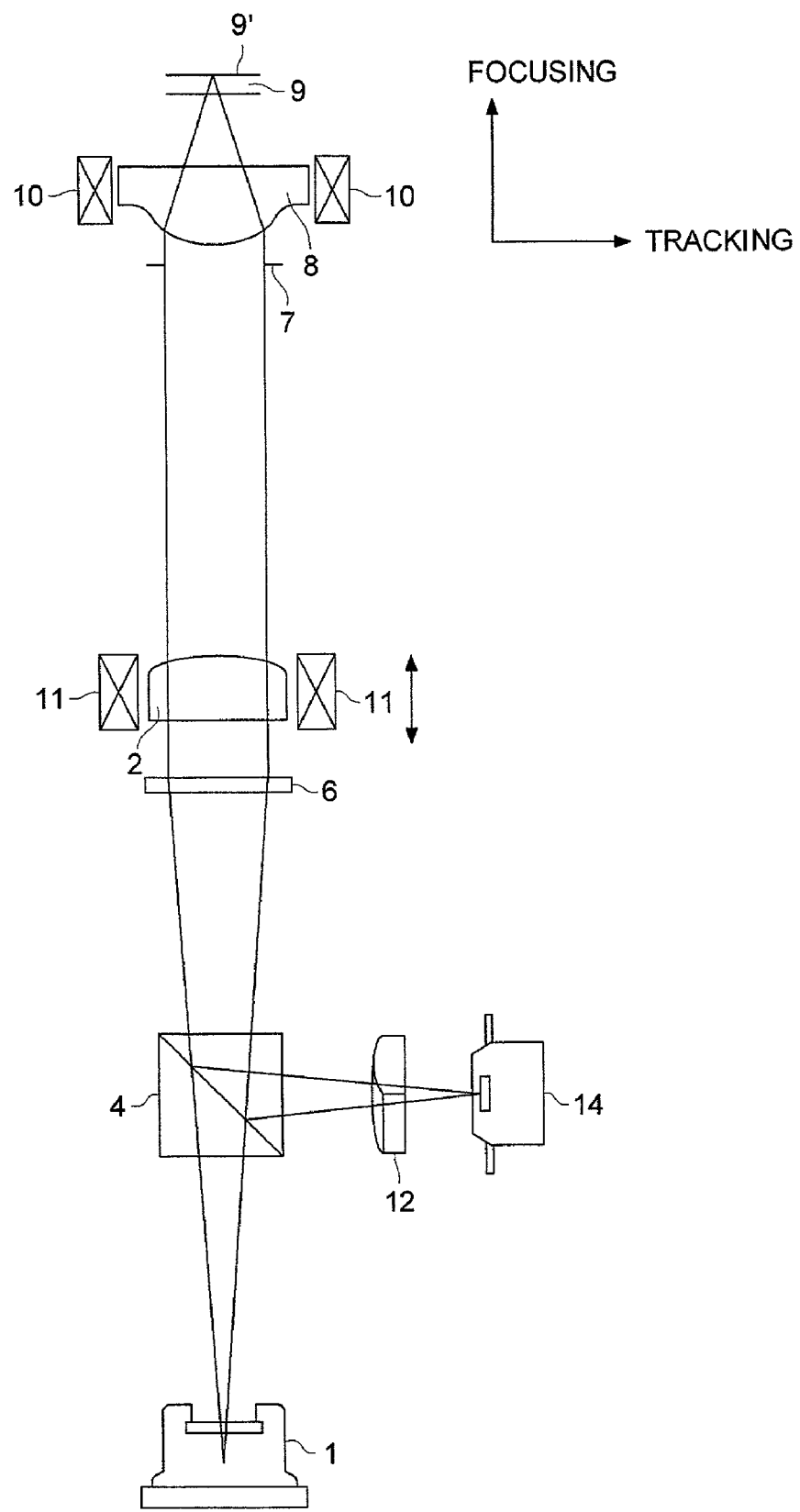
FIG. 1 is a diagram showing schematically an optical pickup device of the present example.

An optical pickup device in an example of the invention will be explained as follows, referring to the drawings. FIG. 1 is a diagram showing schematically the optical pickup device in the present example.

In the pickup device shown in FIG. 1, a light flux emitted from short wavelength light source 1 having wavelength λ of about 400 nm passes through polarization beam splitter 4, ¼ wavelength plate 6, coupling lens 2 and diaphragm 7, and it is converged by objective lens 8 on image recording surface 9' through protective layer 9 of an optical information recording medium. Reflected light from the image recording surface 9' passes through objective lens 8 and coupling lens 2, and then, is reflected by polarization beam splitter 4 and passes through cylindrical lens 12 to advance toward photo detector 14.

The coupling lens 2 representing a spherical aberration correcting means is structured to be capable of being moved by uniaxial actuator 11 representing a driving means for the spherical aberration correcting means in the direction of the optical axis in FIG. 1. The objective lens 8 is driven by biaxial actuator 10 in the focusing direction and in the tracking direction. Incidentally, a voice coil actuator or a piezoelectric actuator can be used as the uniaxial actuator 11.

In the optical pickup device in FIG. 1, when spherical aberration is varied in the light-converging optical system by dispersion of wavelength between light sources, environmental changes such as temperature changes and humidity changes, errors of a thickness of a protective layer of an optical information recording medium and by manufacturing errors for objective lenses, it is possible to correct the spherical aberration by moving the coupling lens 2 in the optical axis direction by the uniaxial actuator 11 and by changing an inclination angle of marginal rays of the light flux emerging from the coupling lens 2.

In FIG. 1, an aspherical single objective lens of the invention having large NA and excellent image height characteristics is used as objective lens 8 and a light source whose wavelength λ is as short as about 400 nm is used as light source 1. Therefore, high density recording and reproducing are possible, and a working distance between objective lens 8 and protective layer 9 of the optical information recording medium can be secured sufficiently.

Next, another pickup device will be explained as follows, referring to FIG. 2. In the pickup device shown in FIG. 2. In the pickup device shown in FIG. 2, a light flux emitted from short wavelength light source 1 having wavelength λ of about 400 nm passes through coupling lens 2, beam shaping prism pair 3, polarization beam splitter 4, beam expander 5, ¼ wavelength plate 6 and diaphragm 7, and it is converged by objective lens 8 on image recording surface 9' through protective layer 9 of an optical information recording medium. Reflected light from the image recording surface 9' passes through objective lens 8 and beam expander 5, and then, is reflected by polarization beam splitter 4 and passes through cylindrical lens 12 and focusing lens 13 to advance toward photodetector 14.

Figure 2:
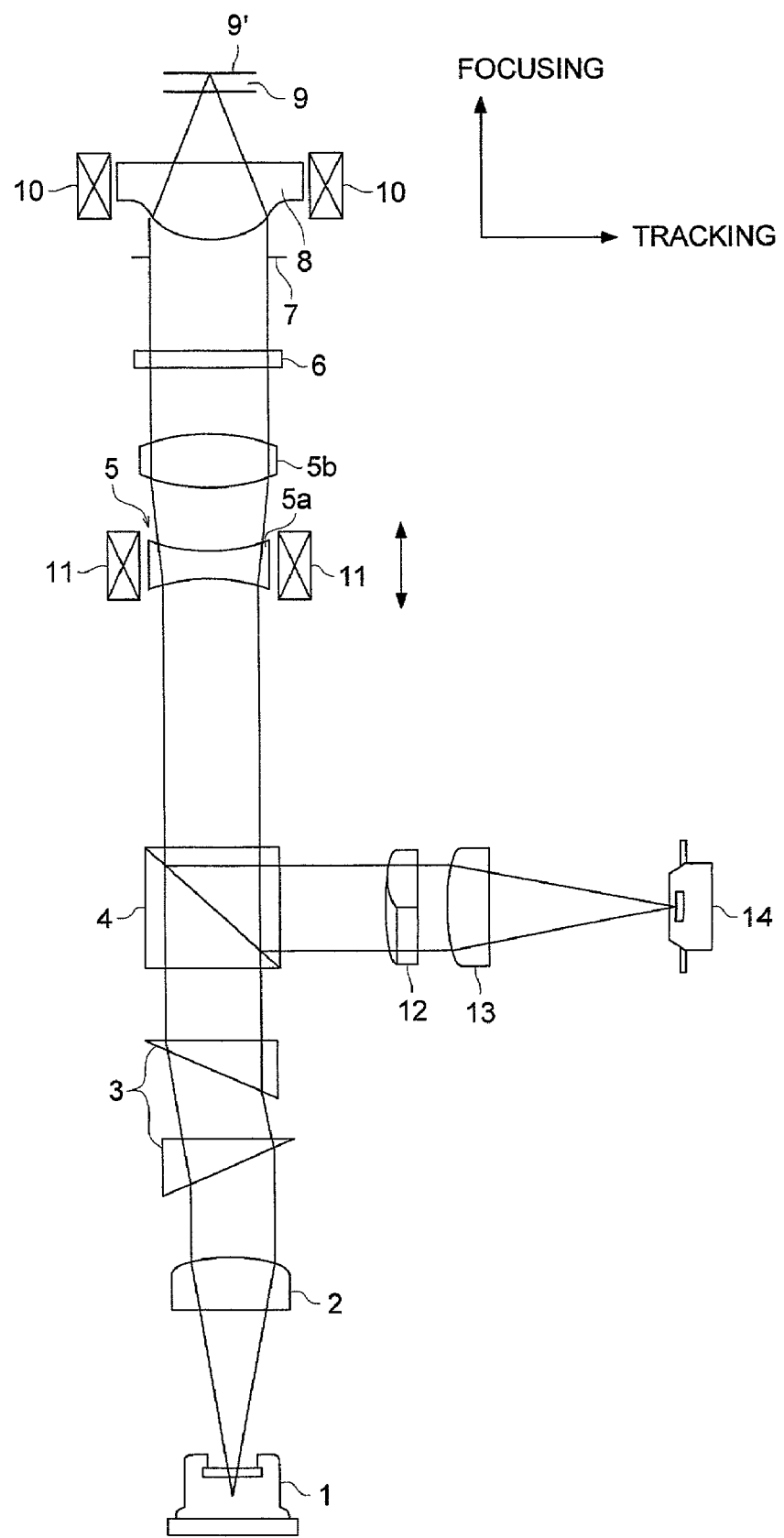
FIG. 2 is a diagram showing schematically another optical pickup device of the present example.

The beam expander 5 representing a spherical aberration correcting means is equipped with negative lens 5a and positive lens 5b, and the negative lens 5a is structured to be capable of being moved by uniaxial actuator 11 representing a driving means for the spherical aberration correcting means in the optical axis direction in FIG. 2. In the optical pickup device in FIG. 2, when spherical aberration is varied in the light-converging optical system by the same causes as in the foregoing, the spherical aberration can be corrected by moving the negative lens 5a of the beam expander 5 arranged between the coupling lens 2 and the objective lens 8 in the optical axis direction with the uniaxial actuator 11. Incidentally, it is also possible to move the positive lens 5b in the optical axis direction.

The optical pickup device in FIGS. 1 and 2 has a spherical aberration detecting means which is not shown and detects fluctuations of spherical-aberration generated in the light-converging optical system by detecting the reflected light from the image recording surface 9', and generates spherical aberration error signals based on the results of the detection. Coupling lens 2 or negative lens 5a of beam expander 5 representing a spherical aberration correcting means is driven so that spherical aberration signals may be zero. As the spherical aberration detecting means stated above and as a spherical aberration detecting method in the spherical aberration detecting means, it is possible to use those described in TOKUGAN No. 2001-108378 by the same applicant. Incidentally, the spherical aberration detecting means mentioned above is arranged in the optical path between a spherical aberration correcting means and a light source.

Further, in the optical pickup device in FIGS. 1 and 2, an element whose refractive index distribution in the direction perpendicular to an optical axis varies electrically can be used as a spherical aberration correcting means, instead of the coupling lens 2 and the beam expander 5 described above. In this case, movable parts are not needed, resulting in achievement of lightweight and cost reduction of an optical pickup device. As the refractive index distribution changeable element, it is possible to use a liquid crystal element using liquid crystal molecules. As a liquid crystal element, it is possible to use, for example, a liquid crystal element wherein liquid crystal element 1 in which liquid crystal molecules are arranged in optional direction X on a plane perpendicular to an optical axis and liquid crystal element 2 in which liquid crystal molecules are arranged in direction Y perpendicular to optional direction X on a plane perpendicular to an optical axis laminated alternately with a ½ wavelength plate and a glass base board between. It is possible to correct fluctuations of spherical aberration generated in the light-converging optical system by impressing voltage on each of the liquid crystal element 1 and the liquid crystal element 2 and thereby by controlling independently X-direction component and Y-direction component of the phase of wave front which transmit the liquid crystal element representing a refractive index distribution changeable element. Incidentally, the refractive index distribution changeable element has only to be one that can form the refractive index distribution which is almost symmetric about an optical axis, and it is not limited to the form stated above.

In FIG. 2, an aspherical single objective lens of the invention having large NA and excellent image height characteristics is used as objective lens 8 in the same way as in FIG. 1, and a light source whose wavelength λ is as short as about 400 nm is used as light source 1. Therefore, high density recording and reproducing are possible, and a working distance between objective lens 8 and protective layer 9 of the optical information recording medium can be secured sufficiently.

EXAMPLE

Next, Examples 1–9 of an aspherical single objective lens capable of being used in the optical pickup device in FIGS. 1 and 2 will be explained. A list of data of each Example is shown in Table 1.

TABLE 1

| List of Examples | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Material | Glass | Glass | Glass | Glass | Glass | Plastic | Plastic | Plastic | Glass |
| NA | 0.88 | 0.90 | 0.90 | 0.93 | 0.95 | 0.90 | 0.90 | 0.80 | 0.85 |
| f | 1.70 | 1.67 | 1.67 | 1.61 | 1.58 | 1.67 | 1.67 | 1.88 | 1.76 |
| φ1 | 3.00 | 3.00 | 3.00 | 3.00 | 3.00 | 3.00 | 3.00 | 3.00 | 3.00 |
| m | 0 | 0 | 0 | 0 | 0 | 0 | 0 | 0 | 0 |
| WD | 0.29 | 0.29 | 0.66 | 0.31 | 0.27 | 0.30 | 0.31 | 0.77 | 0.70 |
| d | 2.72 | 2.60 | 1.55 | 2.29 | 2.36 | 2.61 | 2.48 | 1.90 | 1.67 |
| λ | 405 | 405 | 405 | 405 | 405 | 405 | 405 | 405 | 405 |

TABLE 1-continued

| List of Examples | Example 1 | Example 2 | Example 3 | Example 4 | Example 5 | Example 6 | Example 7 | Example 8 | Example 9 |
|---|---|---|---|---|---|---|---|---|---|
| d/f | 1.60 | 1.56 | 0.93 | 1.42 | 1.49 | 1.57 | 1.49 | 1.01 | 0.96 |
| $(X1 - X2) \cdot (n - 1)/(NA \cdot f \cdot \sqrt{(1 + |m|)})$ | 0.49 | 0.52 | 0.61 | 0.63 | 0.67 | 0.56 | 0.52 | 0.48 | 0.55 |
| $r1/(n \cdot (1 - |m|) \cdot f)$ | 0.48 | 0.47 | 0.41 | 0.44 | 0.44 | 0.44 | 0.45 | 0.41 | 0.42 |

Incidentally, an aspheric surface of the lens of the present example is expressed by the following expression Numeral 1, when X axis represents the direction of an optical axis, h represents a height in the direction perpendicular to the optical axis and r represents a radius of curvature of the refracting interface, wherein κ represents the constant of the cone and A2i represents an aspherical coefficient.

$$X = \frac{h^2/r}{1 + \sqrt{1 - (1+\kappa)h^2/r^2}} + \sum_{i=2}^{10} A_{2i} h^{2i} \quad \text{(Numeral 1)}$$

A ring-shaped zonal diffractive surface provided on the lens in the present example can be expressed by the following expression Numeral 2 with Φb representing the optical path difference function, wherein h represents a height that is in the direction perpendicular to the optical axis and b2i represents a coefficient of the optical path difference function.

$$\Phi_b = \sum_{i=1}^{5} b_{2i} h^{2i} \quad \text{(Numeral 2)}$$

In the following explanations for Examples 1 to 9, f is a focal length of the objective lens, NA is an optical information recording medium side numerical aperture, t is a thickness of a protective layer of the optical information recording medium, λ is a design standard wavelength, and m is a magnification.

Further, in Tables 2 to 10, r is a paraxial radius of curvature of each surface, d is a distance between faces, Nλ is a diffractive index for the design standard wavelength, and vd is an Abbe constant at d-line.

Figure 3:
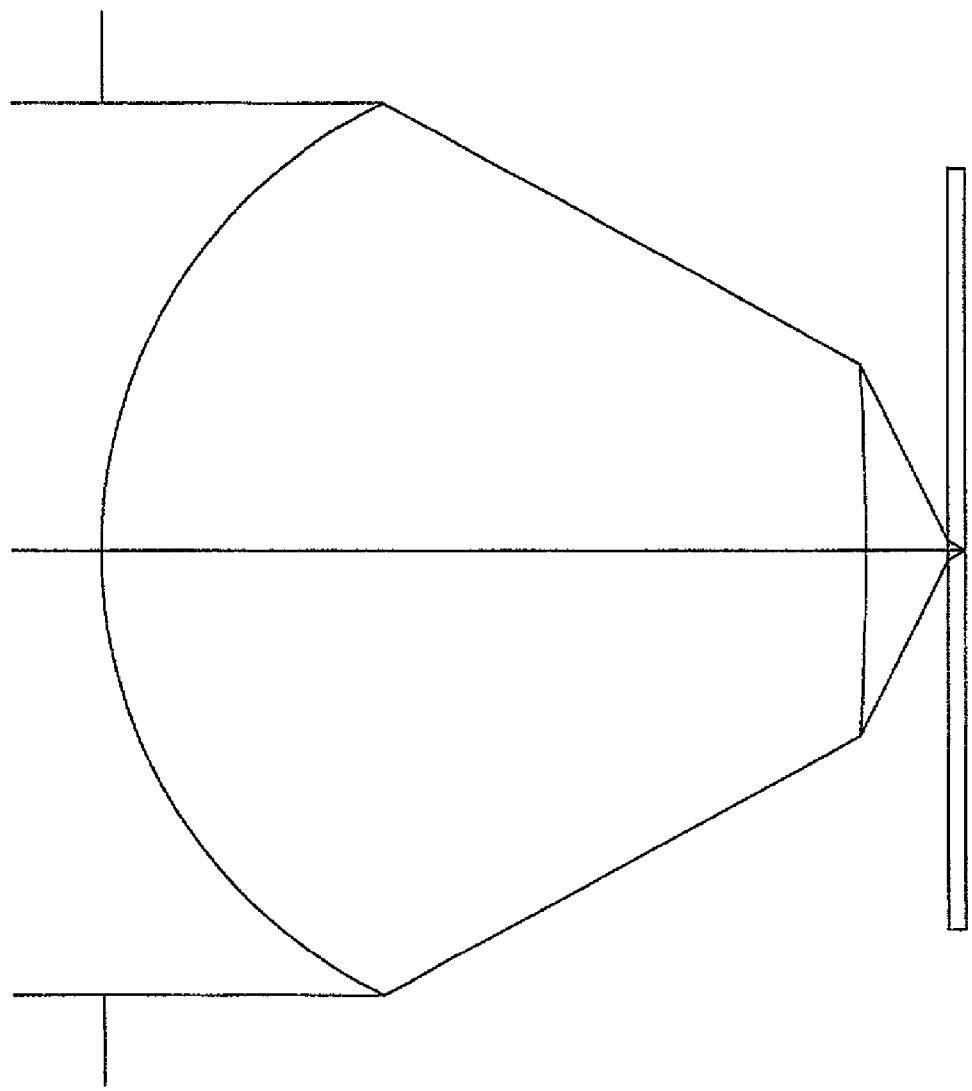
FIG. 3 is an optical path diagram relating to Example 1.
Figure 4:
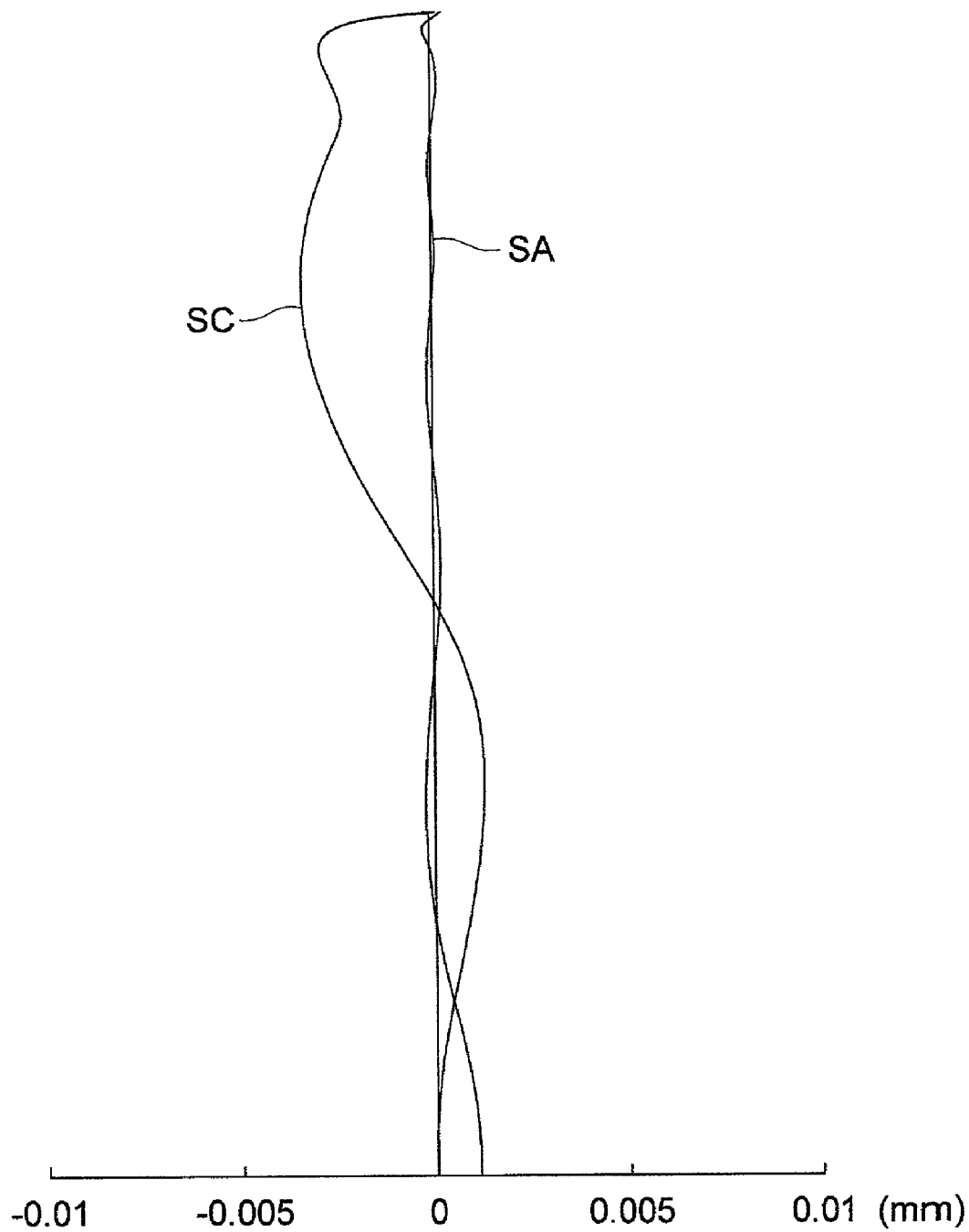
FIG. 4 is a spherical aberration diagram relating to Example 1.

Example 1 represents a bi-aspherical single lens with f=1.70 mm, NA 0.88, t=0.05 mm, λ=405 nm and m=0. Lens data of Example 1 are shown in Table 2. Lens material is optical glass (M-LaC130 made by HOYA Co.). FIG. 3 shows an optical path diagram relating to Example 1, and FIG. 4 shows a spherical aberration diagram relating to Example 1. Incidentally, in the spherical aberration diagram in FIG. 4, SA (Spherical Aberration) represents spherical aberration in the design basis wavelength, and SC (Sine Condition) represents a sine condition. The foregoing also applies to each spherical aberration diagram described later.

TABLE 2

Example 1

| Surface No. | r (mm) | d (mm) | Nλ | vd | Remarks |
|---|---|---|---|---|---|
| 0 | | ∞ | | | Light source |
| 1 | 1.394 | 2.720 | 1.71558 | 53.2 | Objective lens |
| 2 | −1.815 | 0.291 | | | |
| 3 | ∞ | 0.050 | 1.61949 | 30.0 | Protective layer |
| 4 | ∞ | | | | |

Aspherical Coefficient

| | Aspherical coefficient | |
|---|---|---|
| | First surface | Second surface |
| κ | −5.1175E−01 | −1.2353E+02 |
| A4 | 7.4390E−03 | 3.6611E−01 |
| A6 | −4.9328E−03 | −1.5077E+00 |
| A8 | 7.4288E−03 | 2.4137E+00 |
| A10 | −4.3000E−03 | −1.4868E+00 |
| A12 | 2.9744E−04 | −2.5223E−04 |
| A14 | 6.9121E−04 | |
| A16 | −2.2358E−04 | |

Figure 5:
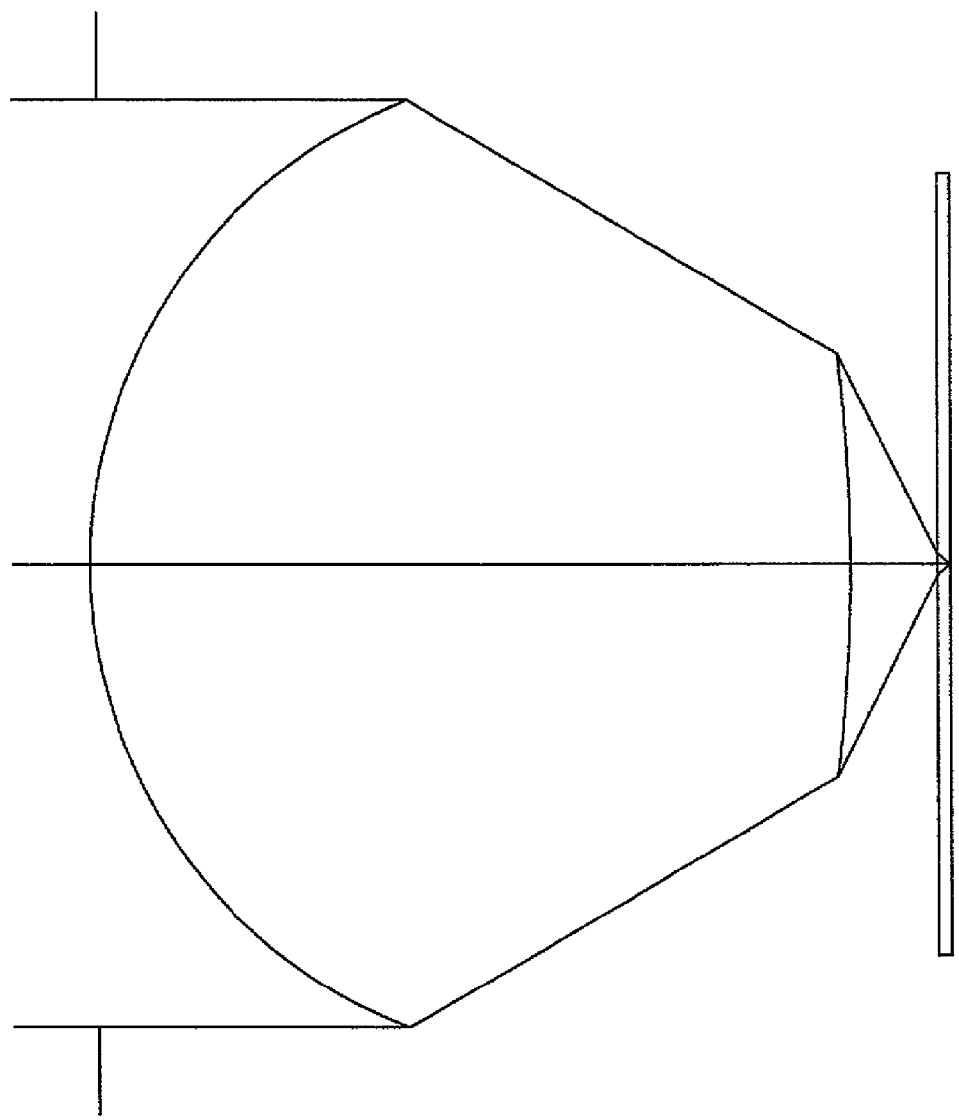
FIG. 5 is an optical path diagram relating to Example 2.
Figure 6:
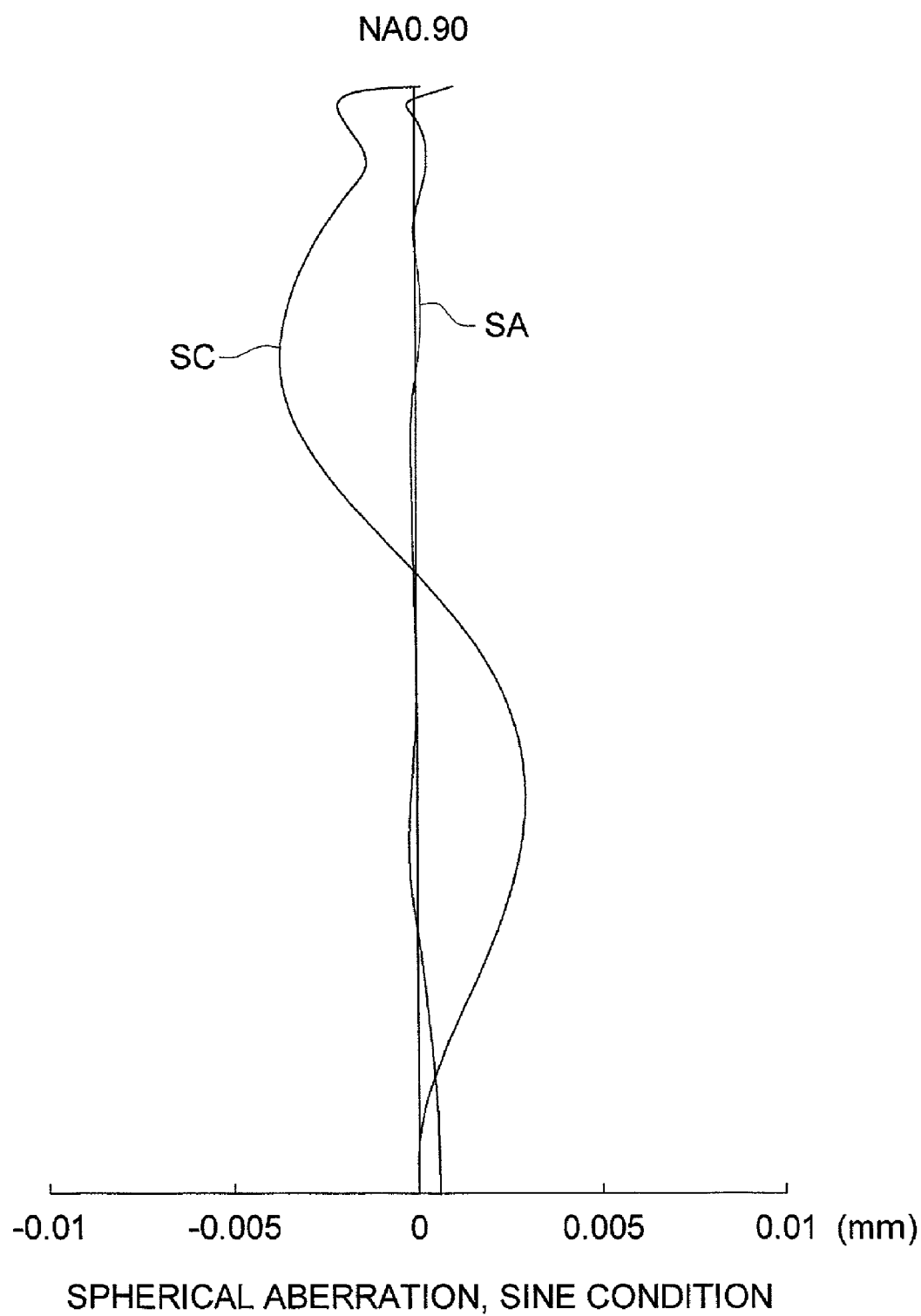
FIG. 6 is a spherical aberration diagram relating to Example 2.

Example 2 represents a bi-aspherical single lens with f=1.67 mm, NA 0.90, t=0.05 mm, λ=405 nm and m=0. Lens data of Example 2 are shown in Table 3. Lens material is optical glass (M-LaC130 made by HOYA Co.). FIG. 5 shows an optical path diagram relating to Example 2, and FIG. 6 shows a spherical aberration diagram relating to Example 2.

TABLE 3

Example 2

| Surface No. | r (mm) | d (mm) | Nλ | vd | Remarks |
|---|---|---|---|---|---|
| 0 | | ∞ | | | Light source |
| 1 | 1.341 | 2.600 | 1.71558 | 53.2 | Objective lens |
| 2 | −2.060 | 0.288 | | | |
| 3 | ∞ | 0.050 | 1.61949 | 30.0 | Protective layer |
| 4 | ∞ | | | | |

| Aspherical coefficient | | |
|---|---|---|
| | First surface | Second surface |
| κ | −5.2782E−01 | −1.9521E+02 |
| A4 | 8.7032E−03 | 3.4553E−01 |
| A6 | −1.5549E−03 | −1.1842E+00 |
| A8 | 2.5660E−03 | 1.5280E+00 |
| A10 | −9.0072E−04 | −7.5384E−01 |
| A12 | 3.2581E−04 | −2.5223E−04 |
| A14 | −1.8182E−04 | |
| A16 | −1.6988E−04 | |
| A18 | 2.0934E−04 | |
| A20 | −5.8326E−05 | |

Figure 7:
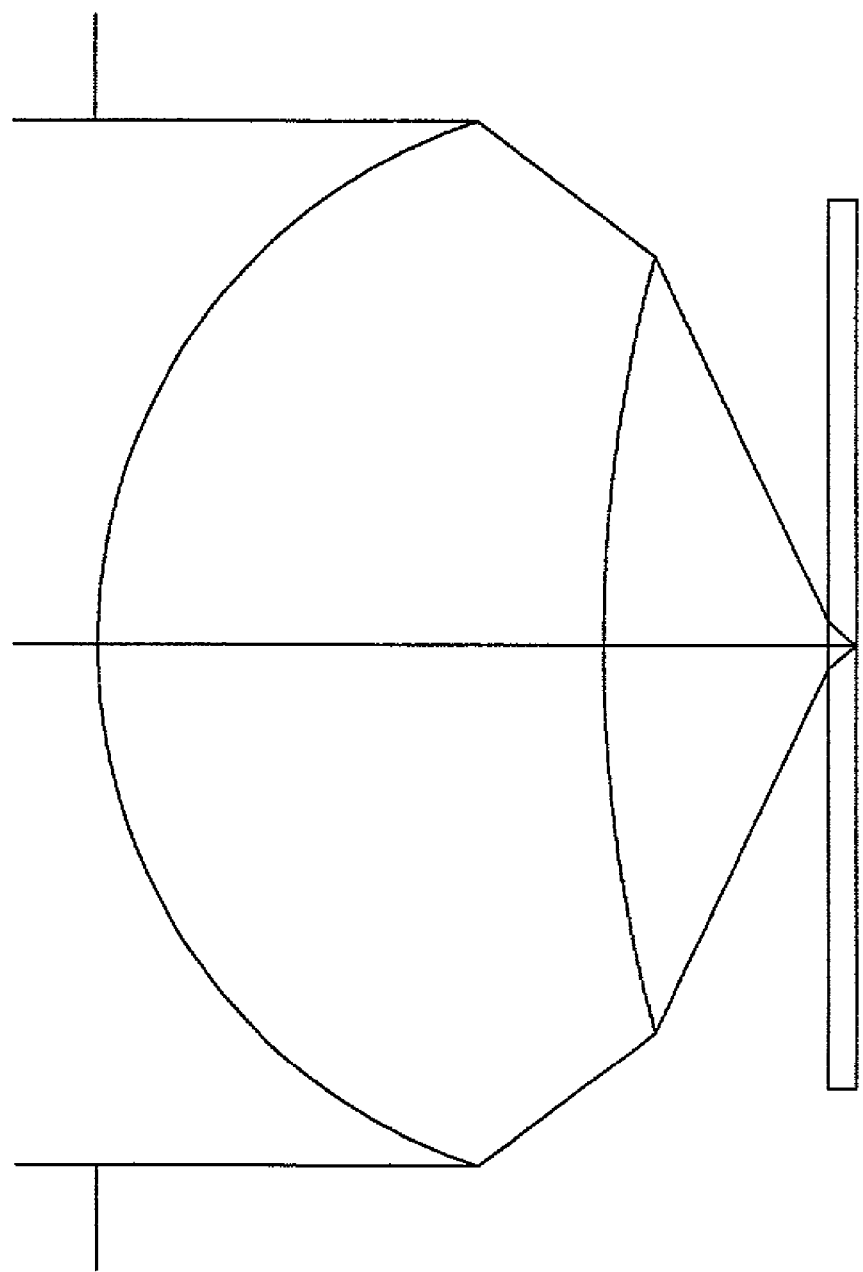
FIG. 7 is an optical path diagram relating to Example 3.
Figure 8:
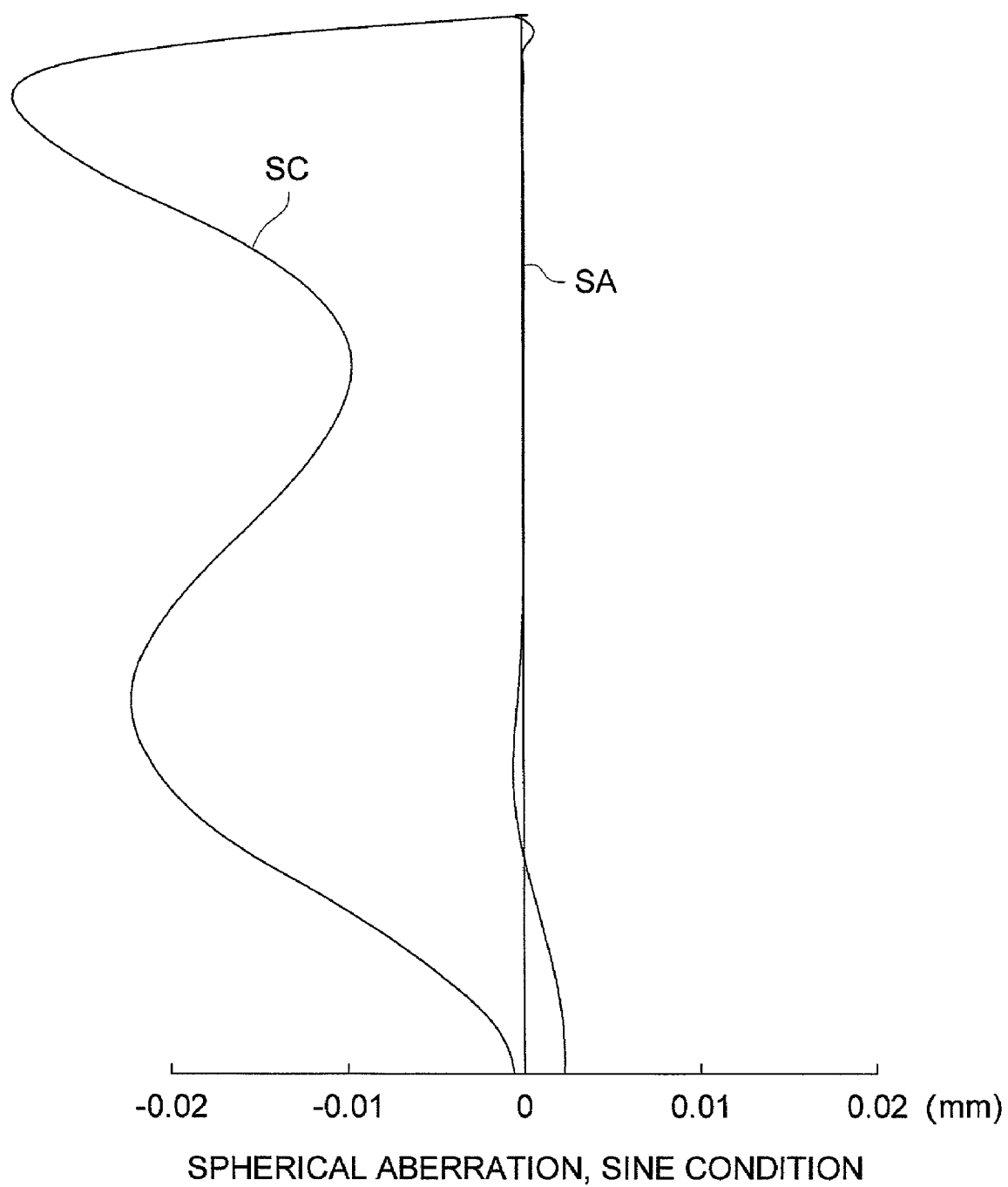
FIG. 8 is a spherical aberration diagram relating to Example 3.

Example 3 represents a bi-aspherical single lens with f=1.67 mm, NA 0.90, t=0.10 mm, λ=405 nm and m=0. Lens data of Example 3 are shown in Table 4. Lens material is optical glass (TAFD30 made by HOYA Co.). FIG. 7 shows an optical path diagram relating to Example 3, and FIG. 7 shows a spherical aberration diagram relating to Example 3, and FIG. 8 shows a spherical aberration diagram relating to Example 3.

TABLE 4

Example 3

| Surface No. | r (mm) | d (mm) | Nλ | νd | Remarks |
|---|---|---|---|---|---|
| 0 | ∞ | | | | Light source |
| 1 | 1.312 | 1.550 | 1.92068 | 40.8 | Objective lens |
| 2 | 3.928 | 0.659 | | | |
| 3 | ∞ | 0.100 | 1.61949 | 30.0 | Protective layer |
| 4 | ∞ | | | | |

| Aspherical coefficient | | |
|---|---|---|
| | First surface | Second surface |
| κ | −3.2219E−01 | −2.6834E+02 |
| A4 | −7.4226E−03 | 3.1801E−01 |
| A6 | 7.7862E−03 | −4.8550E−01 |
| A8 | −2.4945E−03 | 3.8360E−01 |
| A10 | −1.1288E−03 | −1.7071E−01 |
| A12 | 7.0977E−04 | 3.3719E−02 |
| A14 | −1.1302E−04 | |
| A16 | −2.6556E−04 | |
| A18 | 1.6403E−04 | |
| A20 | −5.5177E−05 | |

Figure 9:
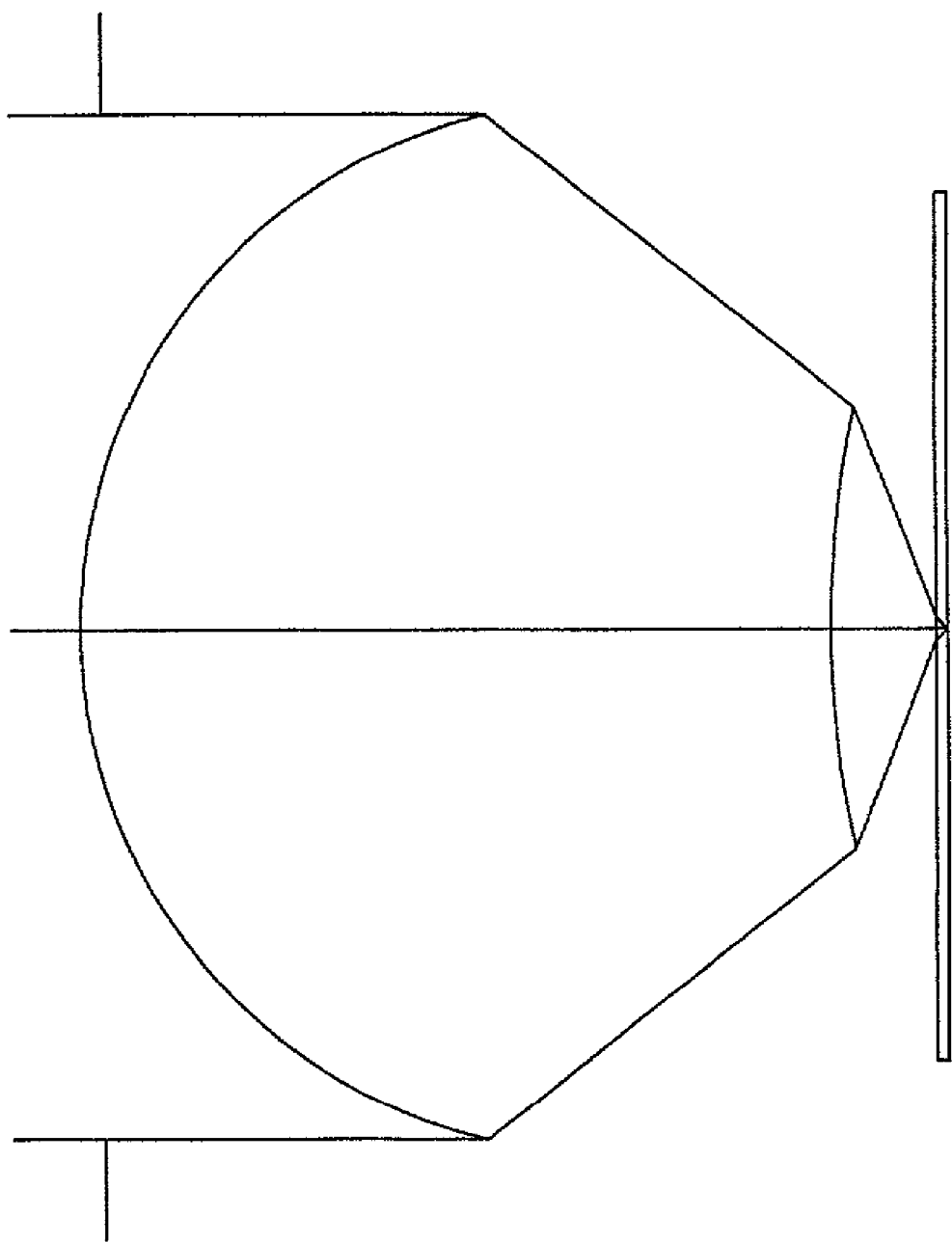
FIG. 9 is an optical path diagram relating to Example 4.
Figure 10:
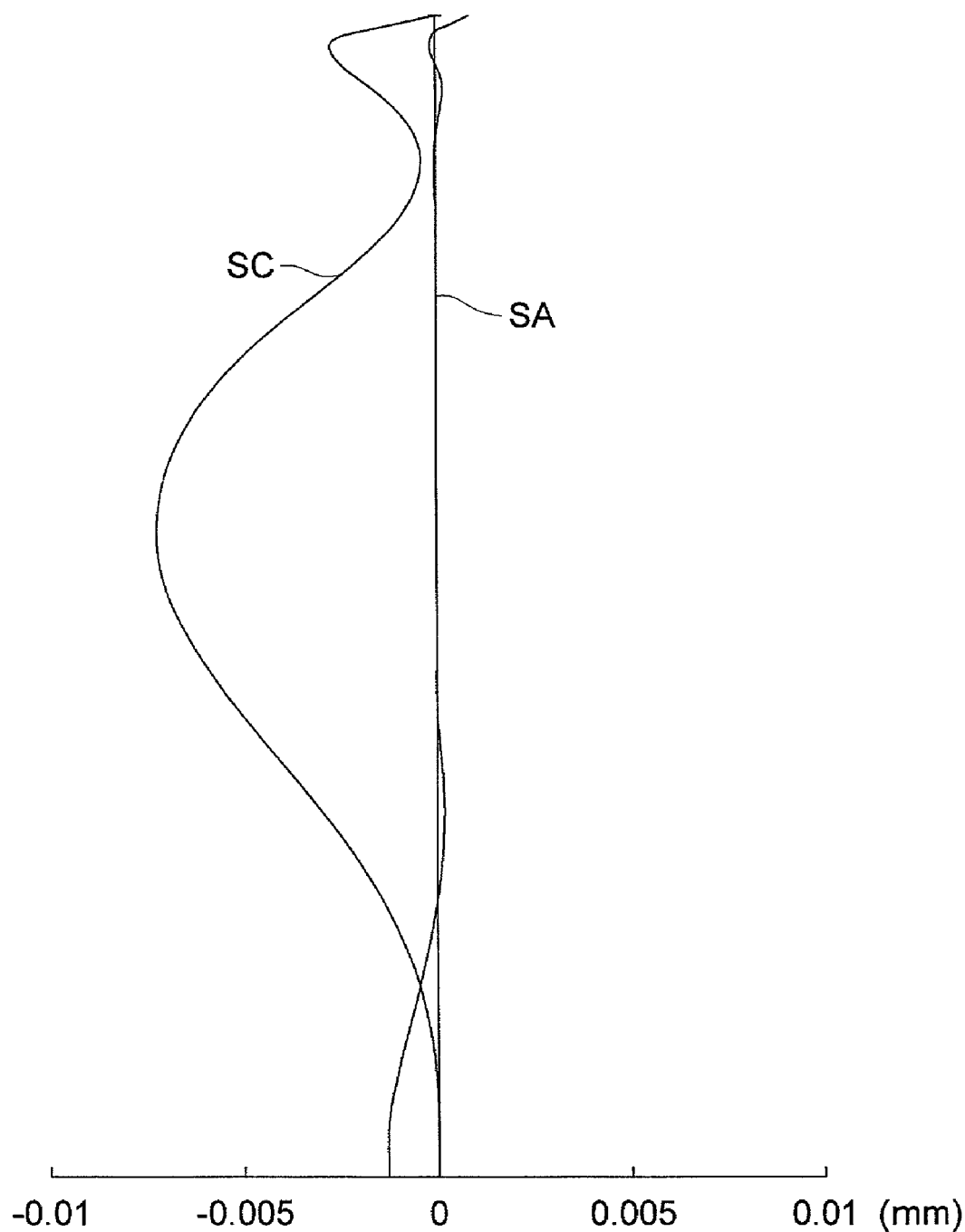
FIG. 10 is a spherical aberration diagram relating to Example 4.

Example 4 represents a bi-aspherical single lens with f=1.61 mm, NA 0.93, t=0.03 mm, λ=405 nm and m=0. Lens data of Example 4 are shown in Table 5. Lens material is optical glass (NBFD13 made by HOYA Co.). FIG. 9 shows an optical path diagram relating to Example 3, and FIG. 7 shows a spherical aberration diagram relating to Example 4, and FIG. 10 shows a spherical aberration diagram relating to Example 4.

TABLE 5

Example 4

| Surface No. | r (mm) | d (mm) | Nλ | νd | Remarks |
|---|---|---|---|---|---|
| 0 | ∞ | | | | Light source |

TABLE 5-continued

Example 4

| Surface No. | r (mm) | d (mm) | Nλ | νd | Remarks |
|---|---|---|---|---|---|
| 1 | 1.313 | 2.290 | 1.84069 | 40.7 | Objective lens |
| 2 | 8.471 | 0.311 | | | |
| 3 | ∞ | 0.030 | 1.61949 | 30.0 | Protective layer |
| 4 | ∞ | | | | |

| Aspherical coefficient | | |
|---|---|---|
| | First surface | Second surface |
| κ | −5.8169E−01 | −2.0475E+02 |
| A4 | 1.0422E−02 | 7.3380E−01 |
| A6 | 9.7940E−03 | −2.3259E+00 |
| A8 | −7.2250E−03 | 3.1121E+00 |
| A10 | 4.4219E−03 | −1.6309E+00 |
| A12 | 1.0776E−03 | −2.5223E−04 |
| A14 | −1.2949E−03 | |
| A16 | −3.2710E−04 | |
| A18 | 5.4088E−04 | |
| A20 | −1.3027E−04 | |

Figure 11:
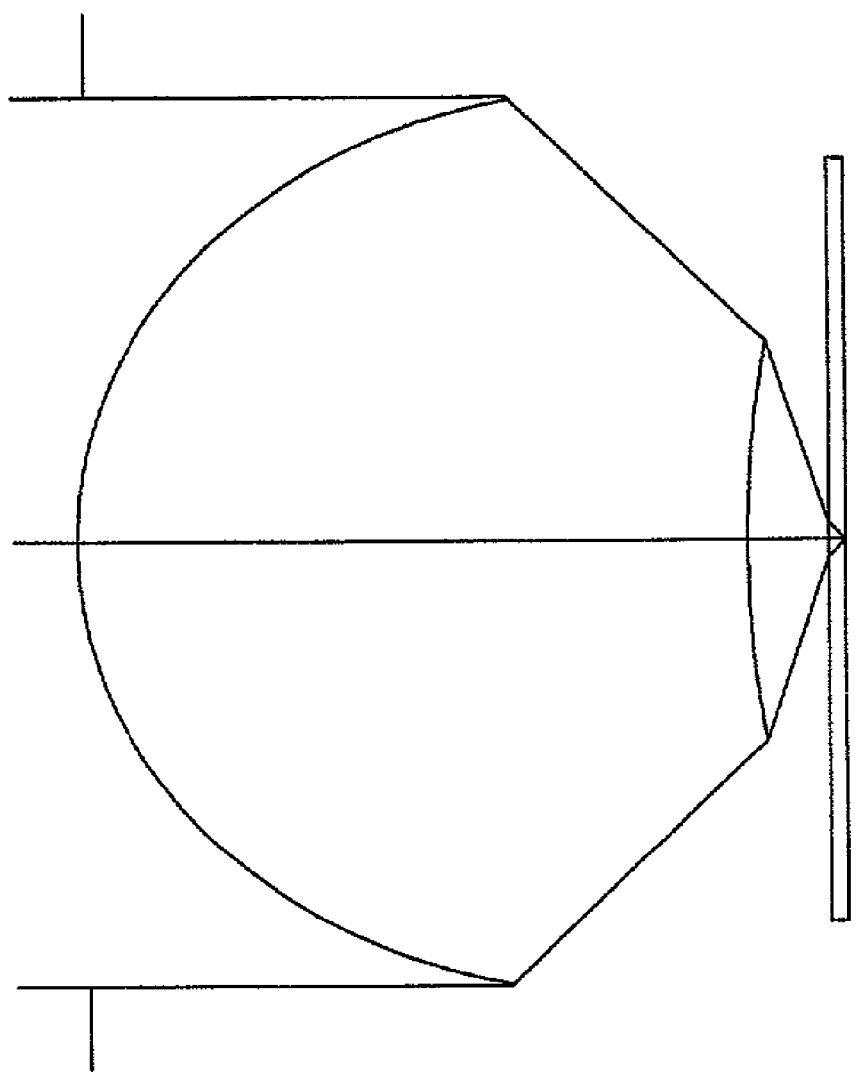
FIG. 11 is an optical path diagram relating to Example 5.
Figure 12:
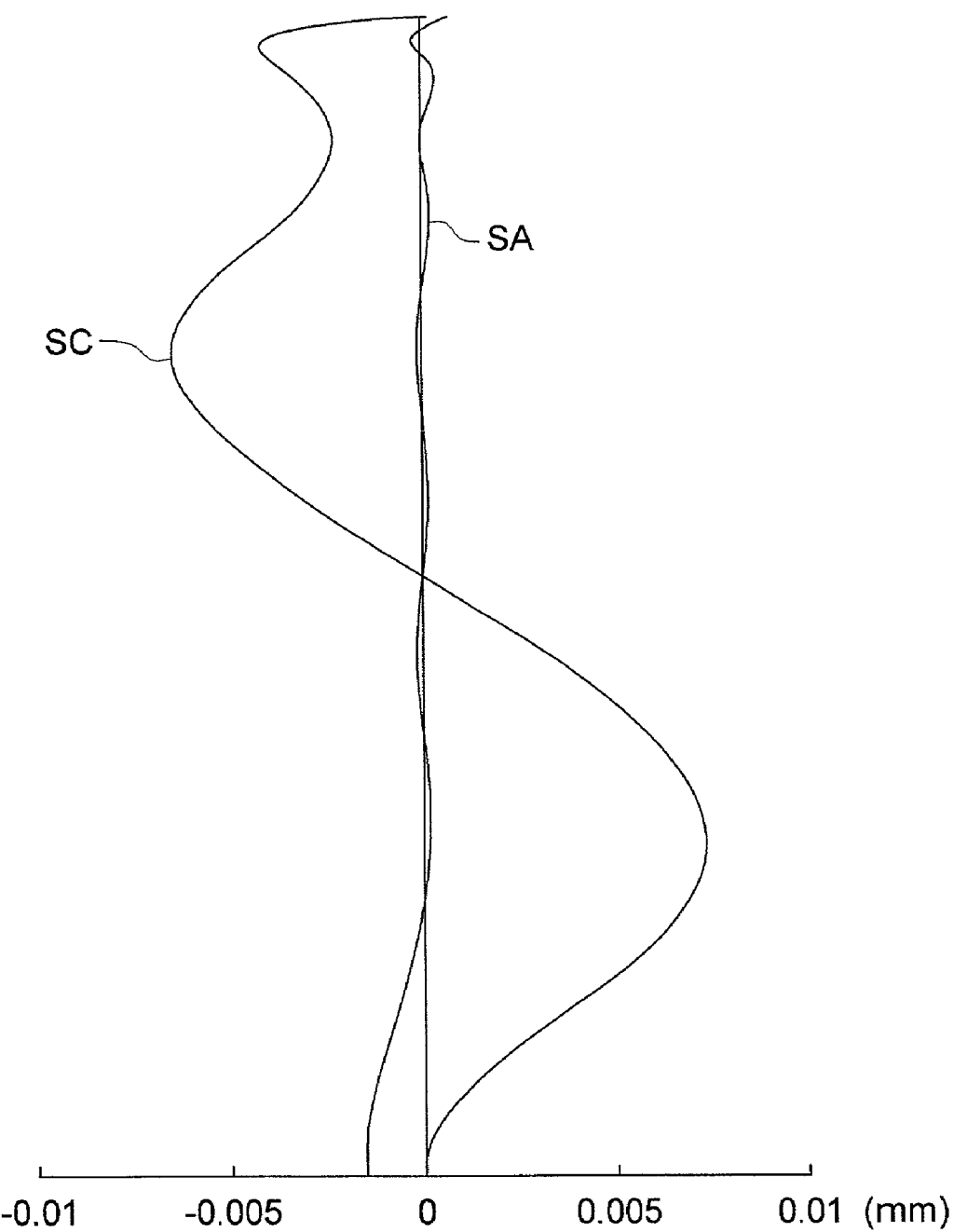
FIG. 12 is a spherical aberration diagram relating to Example 5.

Example 5 represents a bi-aspherical single lens with f=1.58 mm, NA 0.95, t=0.03 mm, λ=405 nm and m=0. Lens data of Example 5 are shown in Table 6. Lens material is optical glass (M-LaC130 made by HOYA Co.). FIG. 11 shows an optical path diagram relating to Example 5, and FIG. 12 shows spherical aberration diagram relating to Example 5.

TABLE 6

Example 5

| Surface No. | r (mm) | d (mm) | Nλ | νd | Remarks |
|---|---|---|---|---|---|
| 0 | ∞ | | | | Light source |
| 1 | 1.199 | 2.360 | 1.71558 | 53.2 | Objective lens |
| 2 | −3.501 | 0.266 | | | |
| 3 | ∞ | 0.030 | 1.61949 | 30.0 | Protective layer |
| 4 | ∞ | | | | |

| Aspherical coefficient | | |
|---|---|---|
| | First surface | Second surface |
| κ | −5.9191E−01 | −1.5546E+03 |
| A4 | 1.4790E−02 | 9.4609E−01 |
| A6 | 1.0457E−02 | −2.5954E+00 |
| A8 | −7.8362E−03 | 3.3480E+00 |
| A10 | 5.7585E−03 | −1.7069E+00 |
| A12 | 1.3185E−03 | −2.5223E−04 |
| A14 | −1.5245E−03 | |
| A16 | −3.9077E−04 | |
| A18 | 6.3012E−04 | |
| A20 | −1.3137E−04 | |

Figure 13:
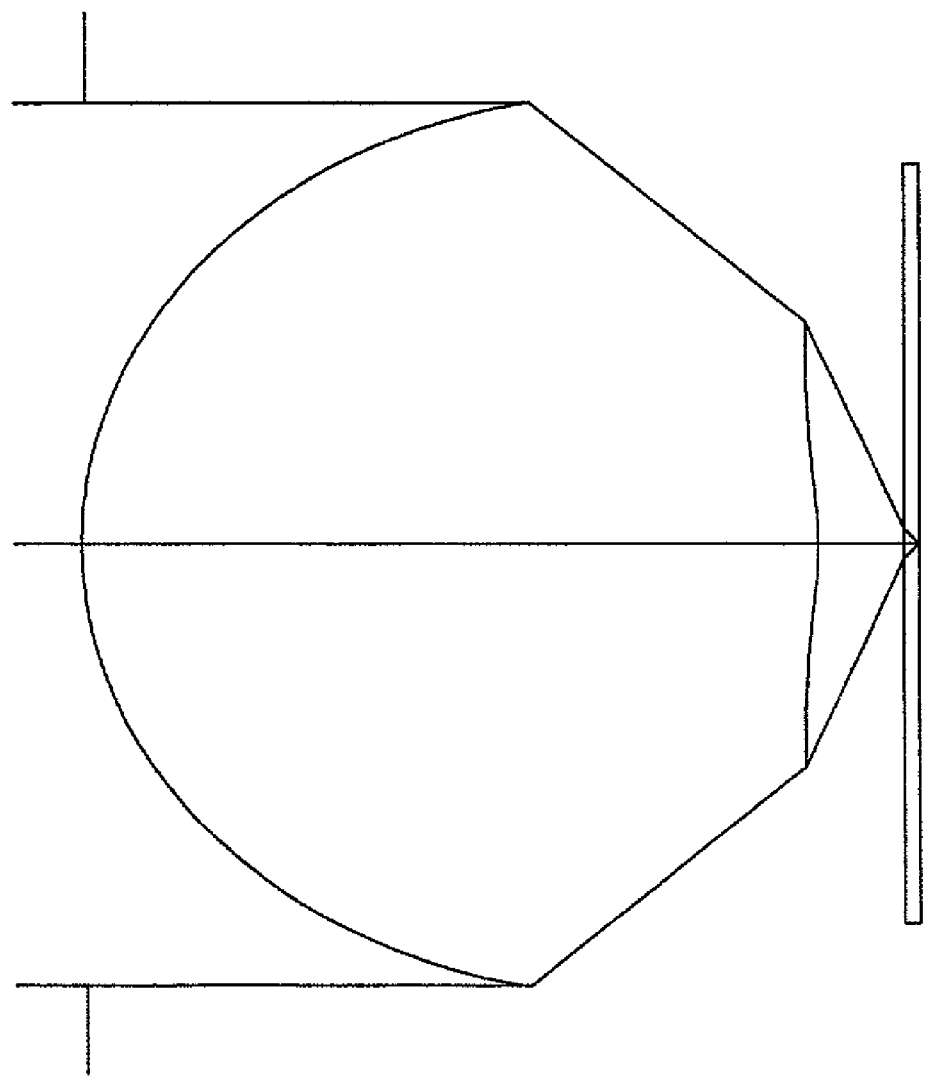
FIG. 13 is an optical path diagram relating to Example 6.
Figure 14:
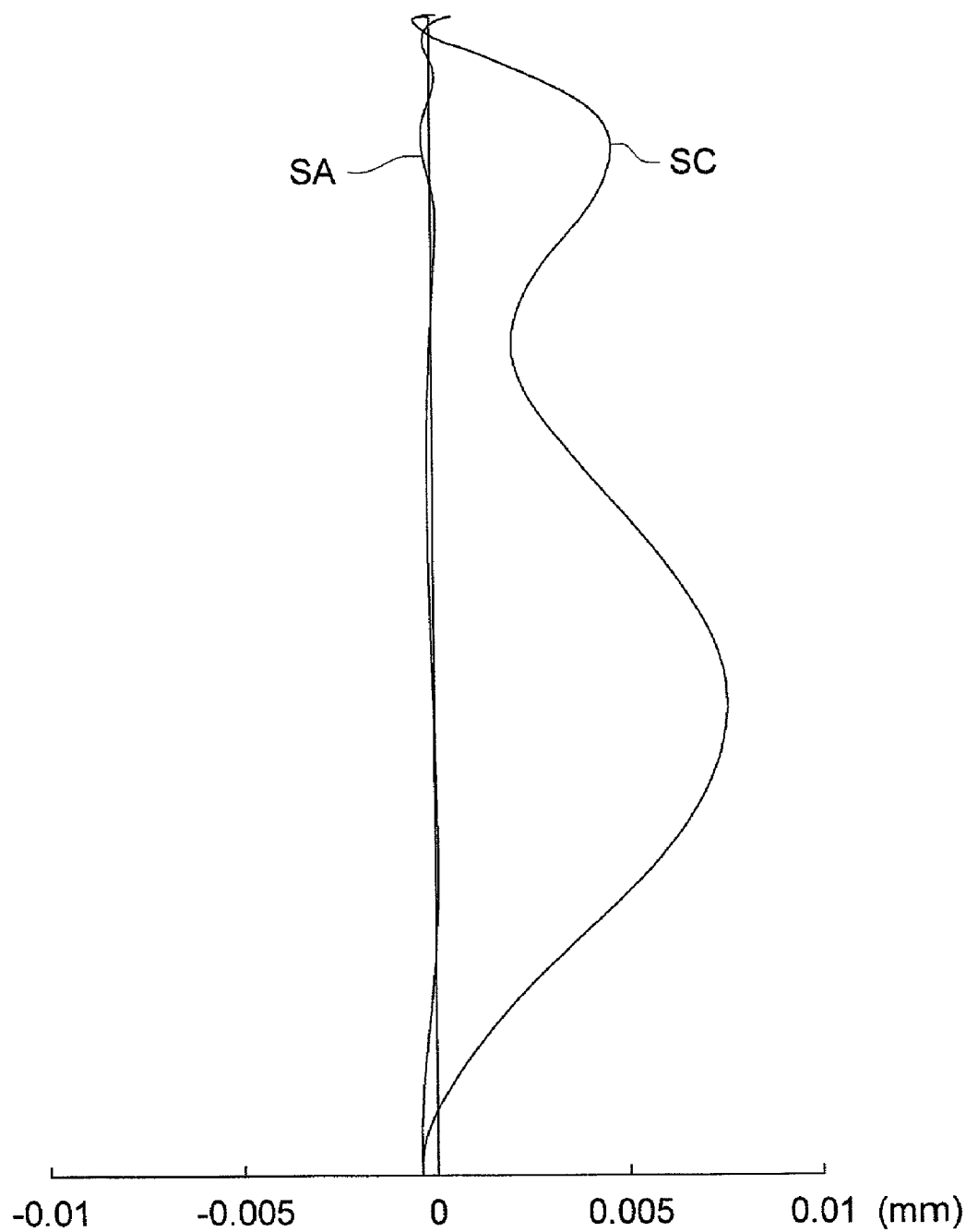
FIG. 14 is a spherical aberration diagram relating to Example 6.

Example 6 represents a bi-aspherical single lens with f=1.67 mm, NA 0.90, t=0.05 mm, λ=405 nm and m=0. Lens data of Example 6 are shown in Table 7. Lens material is optical plastic that is polyolefin norubornane resin wherein internal transmittance for thickness 3 mm in an area of the wavelength used is 95% or more and a coefficent of saturated moisture absorption is 0.01% or less and specific gravity is about 1.0. FIG. 13 shows an optical path diagram relating to Example 6, and FIG. 14 shows a spherical aberration diagram relating to Example 6.

TABLE 7

Example 6

| Surface No. | r (mm) | d (mm) | Nλ | νd | Remarks |
|---|---|---|---|---|---|
| 0 | | ∞ | | | Light source |
| 1 | 1.116 | 2.610 | 1.52491 | 56.5 | Objective lens |
| 2 | −0.789 | 0.295 | | | |
| 3 | ∞ | 0.050 | 1.61949 | 30.0 | Protective layer |
| 4 | ∞ | | | | |

Aspherical coefficient

| | First surface | Second surface |
|---|---|---|
| κ | −6.8226E−01 | −2.7986E+01 |
| A4 | 1.9655E−02 | 5.1704E−01 |
| A6 | 9.2702E−03 | −1.0183E+00 |
| A8 | −5.5977E−03 | 9.6225E−01 |
| A10 | 6.0887E−03 | −3.6251E−01 |
| A12 | −6.9381E−04 | −2.5227E−04 |
| A14 | −8.2462E−04 | |
| A16 | 1.7662E−04 | |
| A18 | 2.0662E−04 | |
| A20 | −5.5685E−05 | |

Figure 15:
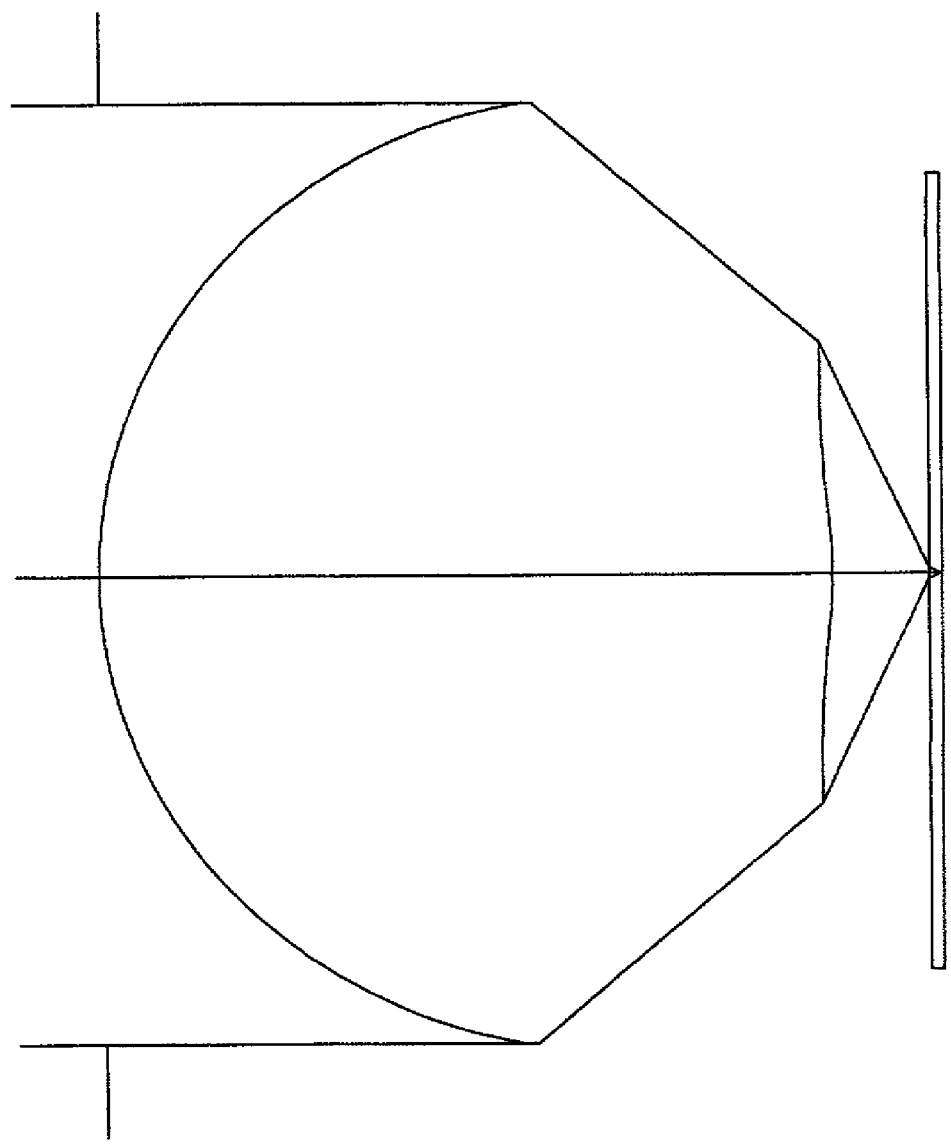
FIG. 15 is an optical path diagram relating to Example 7.
Figure 16:
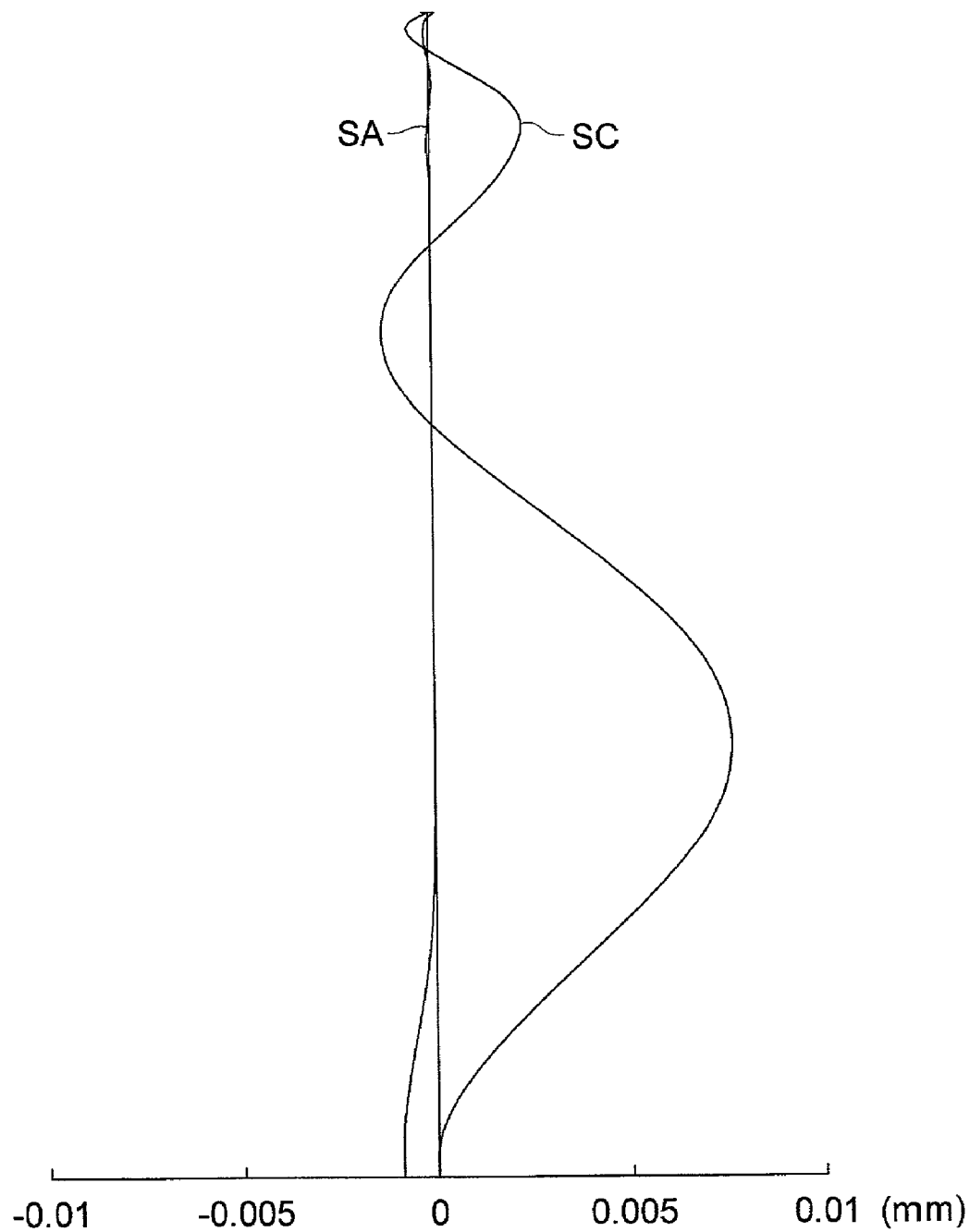
FIG. 16 is a spherical aberration diagram relating to Example 7.

Example 7 represents a bi-aspherical single lens with f=1.67 mm, NA 0.90, t=0.05 mm, λ=405 nm and m=0. Lens data of Example 7 are shown in Table 8. Lens material is the same optical plastic as in Example 6, and therefore, explanation thereof is omitted here. Since the longitudinal chromatic aberration was corrected by making the surface on the light source side to be a diffractive surface, it was possible to keep the defocus component of wavefront aberration in the case of occurrence of mode hopping of +1 nm to be as small as 0.006 λrms (calculated value). In this case, the coefficient of the optical path difference function indicating the optical path difference to be added by the diffractive structure to transmitted wave front was designed so that the first order diffracted ray may have the maximum amount of light. FIG. 15 shows an optical path diagram concerning Example 7, and FIG. 16 shows a spherical aberration diagram concerning Example 7.

TABLE 8

Example 7

| Surface No. | r (mm) | d (mm) | Nλ | νd | Remarks |
|---|---|---|---|---|---|
| 0 | | ∞ | | | Light source |
| 1 | 1.155 | 2.480 | 1.52491 | 56.5 | Objective lens |
| 2 | −0.970 | 0.307 | | | |
| 3 | ∞ | 0.050 | 1.61949 | 30.0 | Protective layer |
| 4 | ∞ | | | | |

Aspherical coefficient

| | First surface | Second surface |
|---|---|---|
| κ | −6.7685E−01 | −3.8605E+01 |
| A4 | 1.7745E−02 | 5.2372E−01 |
| A6 | 1.0276E−02 | −1.0528E+00 |
| A8 | −5.9520E−03 | 1.0235E+00 |
| A10 | 5.8384E−03 | −4.0062E−01 |
| A12 | −7.0069E−04 | −2.5227E−04 |
| A14 | −8.1833E−04 | |
| A16 | 1.6712E−04 | |
| A18 | 1.9714E−04 | |
| A20 | −5.5891E−05 | |

Diffractive surface coefficient

| | First surface |
|---|---|
| b2 | −1.8000E−02 |
| b4 | −2.7896E−03 |
| b6 | −1.7532E−04 |
| b8 | 6.0732E−05 |
| b10 | −2.4525E−04 |

In the objective lenses of Example 1–Example 7, image height characteristics were corrected satisfactorily by designing so that the expressions (2), (21) and (27) are satisfied.

Figure 17:
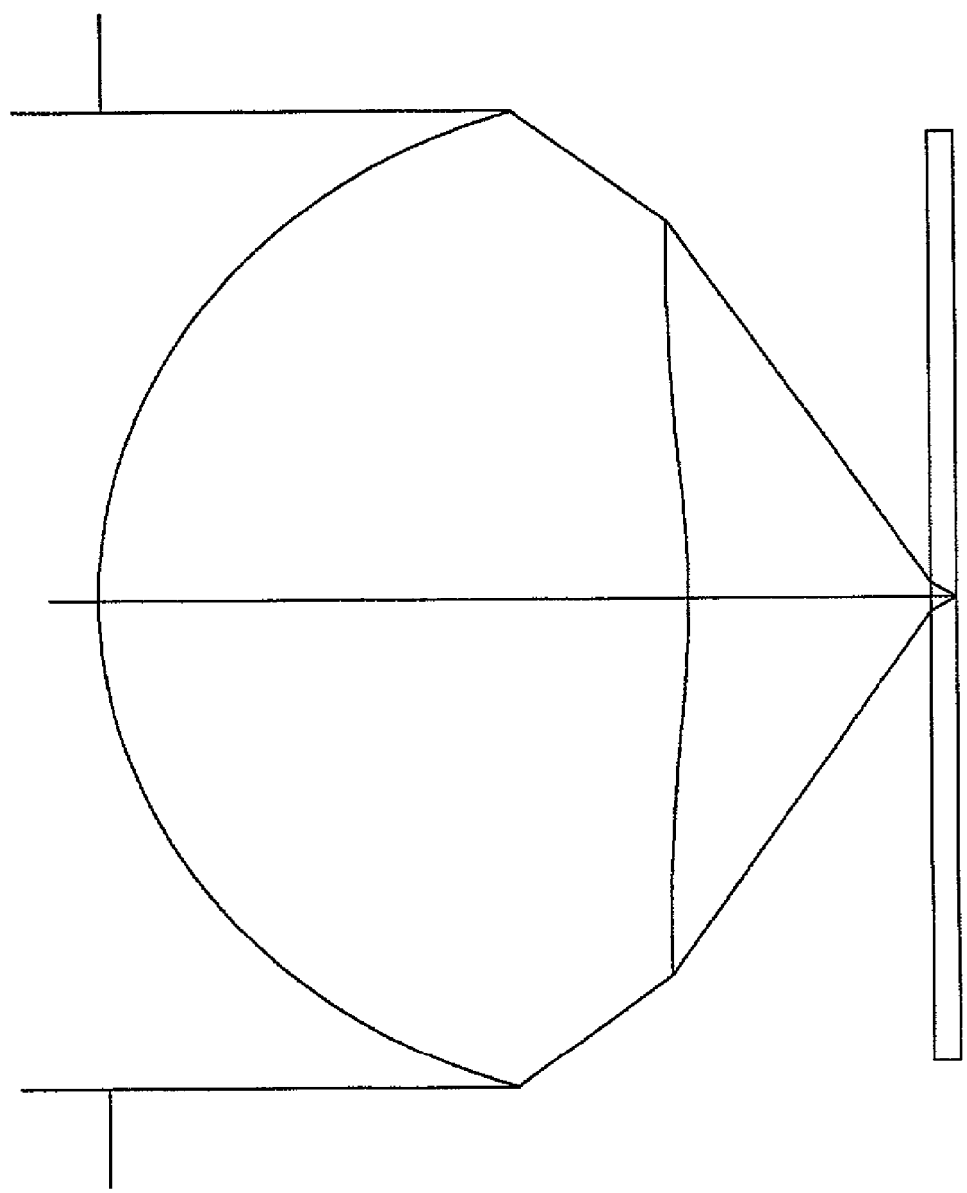
FIG. 17 is an optical path diagram relating to Example 8.
Figure 18:
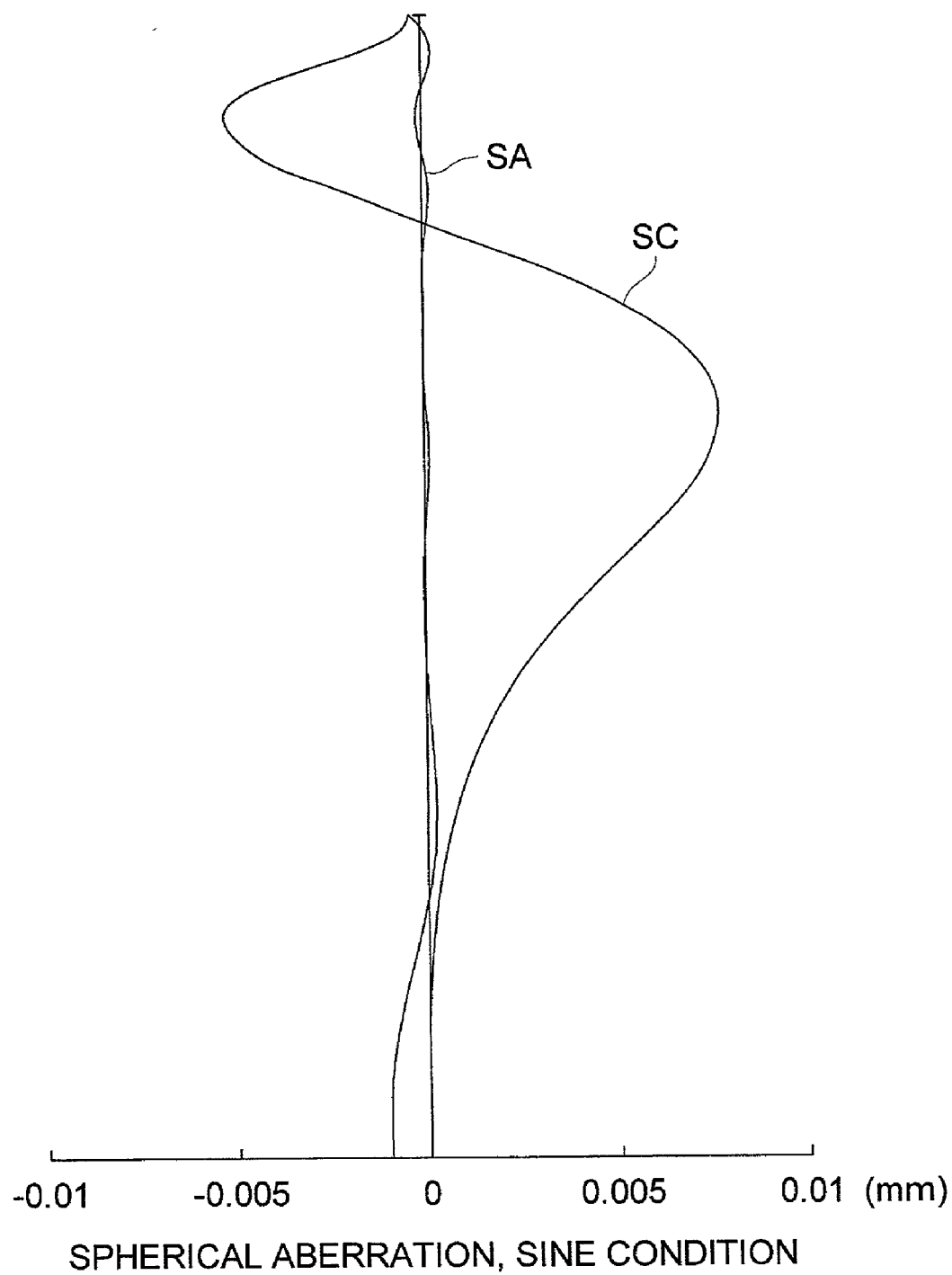
FIG. 18 is a spherical aberration diagram relating to Example 8.

Example 8 represents a bi-aspherical single lens with f=1.88 mm, NA 0.80, t=0.10 mm, λ=405 nm and m=0. Lens data of Example 8 are shown in Table 9. Lens material is the same optical plastic as in Example 6, and therefore, explanation thereof is omitted here. FIG. 17 shows an optical path diagram concerning Example 8, and FIG. 18 shows a spherical aberration diagram concerning Example 8.

TABLE 9

Example 8

| Surface No. | r (mm) | d (mm) | Nλ | νd | Remarks |
|---|---|---|---|---|---|
| 0 | | ∞ | | | Light source |
| 1 | 1.174 | 1.900 | 1.52491 | 56.5 | Objective lens |
| 2 | −2.698 | 0.769 | | | |
| 3 | ∞ | 0.100 | 1.61949 | 30.0 | Protective layer |
| 4 | ∞ | | | | |

Aspherical coefficient

| | First surface | Second surface |
|---|---|---|
| κ | −6.7347E−01 | −3.4605E+00 |
| A4 | 1.1602E−02 | 2.6641E−01 |
| A6 | 8.6896E−03 | −3.0252E−01 |
| A8 | −2.8397E−03 | 1.9603E−01 |
| A10 | 1.7406E−03 | −6.4570E−02 |
| A12 | 5.0916E−04 | 8.5516E−03 |
| A14 | −2.6429E−04 | |
| A16 | −1.1894E−04 | |
| A18 | −2.3848E−05 | |
| A20 | 3.2543E−05 | |

Figure 19:
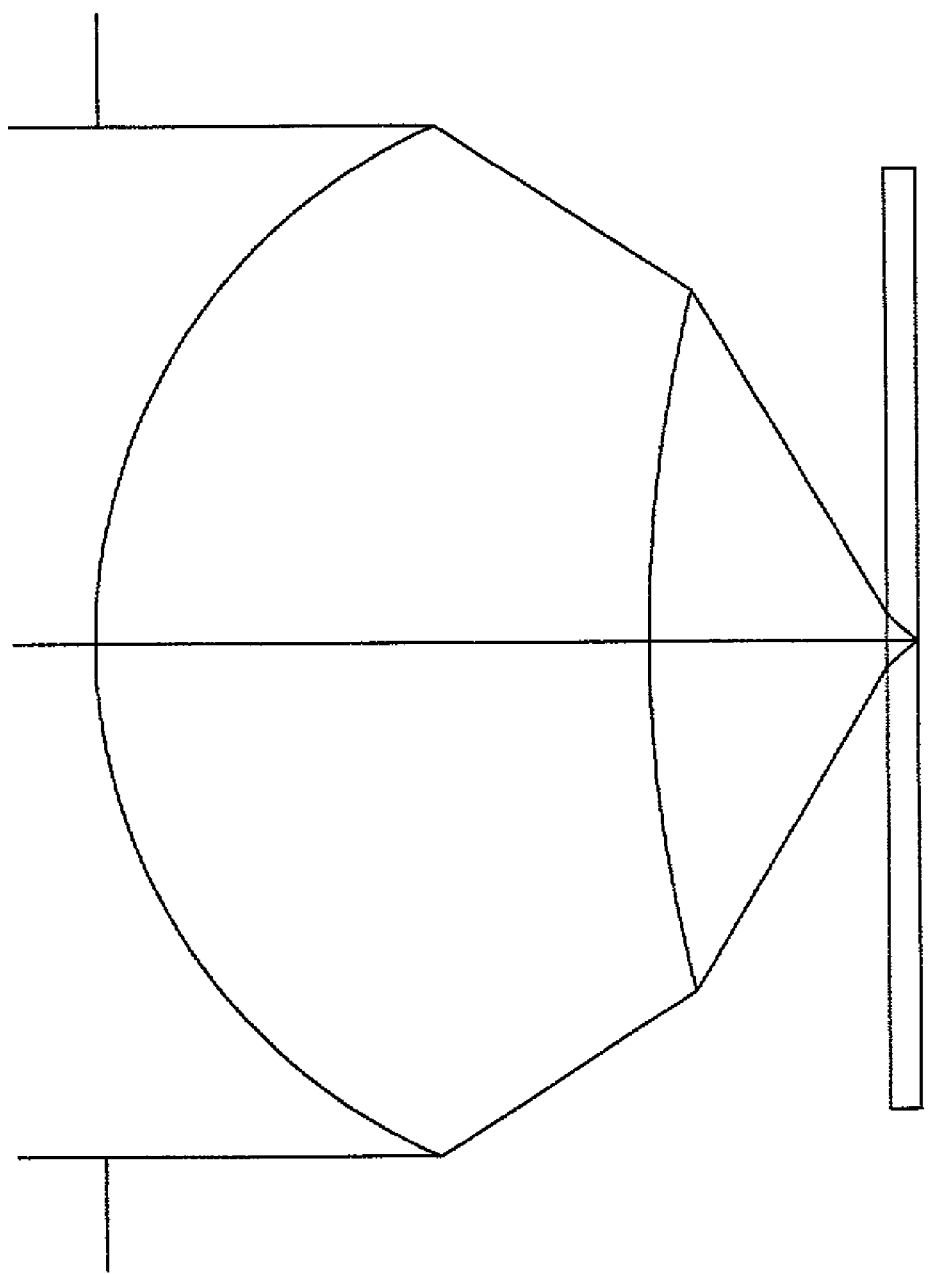
FIG. 19 is an optical path diagram relating to Example 9.
Figure 20:
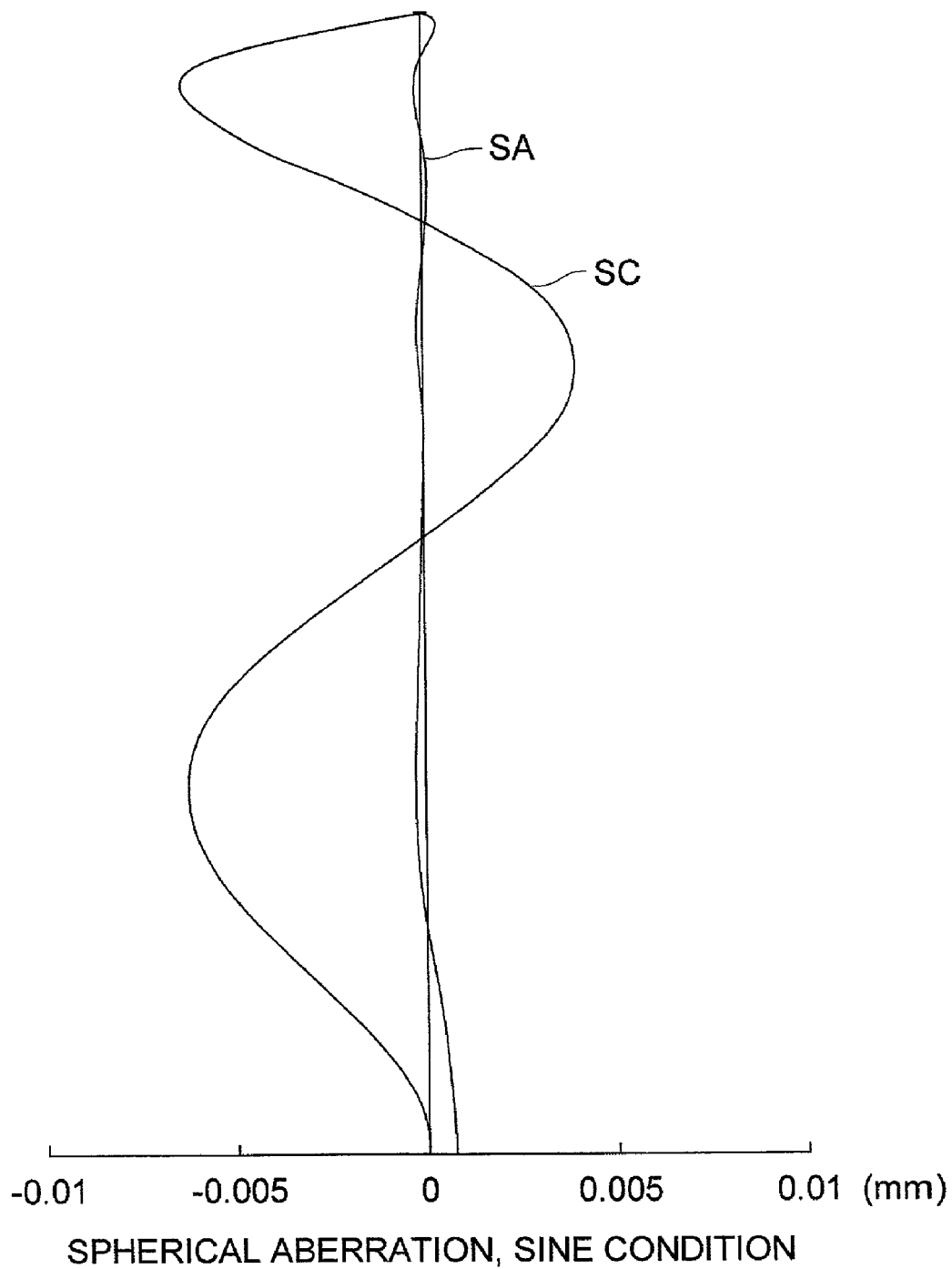
FIG. 20 is a spherical aberration diagram relating to Example 9.

Example 9 represents a bi-aspherical single lens with f=1.76 mm, NA 0.85, t=0.10 mm, λ=405 nm and m=0. Lens data of Example 9 are shown in Table 10. Lens material is optical glass (TAFD30 made by HOYA Co.). FIG. 19 shows an optical path diagram relating to Example 9, and FIG. 20 shows a spherical aberration diagram relating to Example 9.

TABLE 10

Example 9

| Surface No. | r (mm) | d (mm) | Nλ | vd | Remarks |
|---|---|---|---|---|---|
| 0 | | ∞ | | | Light source |
| 1 | 1.419 | 1.670 | 1.92068 | 40.8 | Objective lens |
| 2 | 4.807 | 0.705 | | | |
| 3 | ∞ | 0.100 | 1.61949 | 30.0 | Protective layer |
| 4 | ∞ | | | | |

Aspherical Coefficient

| | Aspherical coefficient | |
|---|---|---|
| | First surface | Second surface |
| κ | −3.6110E−01 | −2.6410E+02 |
| A4 | −2.1001E−03 | 2.3514E−01 |
| A6 | 4.2810E−03 | −3.3757E−01 |
| A8 | −1.7174E−03 | 2.2984E−01 |
| A10 | −1.9645E−04 | −7.9308E−02 |
| A12 | 4.1616E−04 | 1.0113E−02 |
| A14 | −1.4791E−04 | |
| A16 | −1.3566E−04 | |
| A18 | 7.0222E−05 | |
| A20 | −1.3656E−05 | |

In the objective lenses of Examples 8 and 9, it was possible to correct the image height characteristics satisfactorily and to secure the working distance of 0.7 mm or more in spite of the small diameter and high NA lens wherein a diameter of a light flux entering the surface of the lens on the light source side is 3 mm, by designing so that the expressions (23), (25) and (27) are satisfied.

Incidentally, in the table or the diagram stated above, E (or e) is sometimes used to express an exponent of 10 in the way, for example, of E-02 (=$10^{-2}$).

The present invention makes it possible to provide an aspherical single objective lens wherein the numerical aperture is made to be greater than 0.85 and image height characteristics are excellent in an objective lens for recording and/or reproduction of information for an optical information recording medium, and to provide an aspherical single objective lens which is suitable to be used in a high density optical pickup device employing a light source having a wavelength that is as short as about 400 nm, and the numerical aperture of which is made to be greater than 0.85. It is further possible to provide an aspherical single objective lens wherein image height characteristics are excellent, a working distance is secured sufficiently and weight is less, in an aspherical single lens whose numerical aperture is made to be greater than 0.70.

It is further possible to provide an optical pickup device equipped with the objective lens mentioned above and can conduct high density recording and high density reproducing, and to provide a recording/reproducing apparatus.

What is claimed is:

1. An objective lens for recording and/or reproducing information of an optical information recording medium, comprising:
at least one aspherical surface;
wherein the objective lens is a single lens and satisfies the following formulas:

$0.85 < NA < 0.98$ $0.80 < d/f < 3.00$ $0.5 < \phi 1 < 5.8$ $0.40 < (X1-X2) \cdot (n-1)/(NA \cdot f \cdot \sqrt{(1+|m|)}) < 0.80$ where
NA is an optical information recording medium side numerical aperture,
d is a thickness (mm) on an optical axis,
f is a focal length (mm) for an object located at an infinite distance,
φ1 is an effective diameter (mm) of a light source side surfaces,
X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and it is assumed that X1 takes a positive sign when it is measured in the direction toward the optical information recording medium from the tangent plane that serves as a reference point, and it takes a negative sign when it is measured in the direction toward the light source,
X2 is a difference (mm) in the direction of an optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and it is assumed that X2 takes a positive sign when it is measured in the direction toward the optical information recording medium from the tangent plane that serves as a reference point, and it takes a negative sign when it is measured in the direction toward the light source,
n is a refractive index of the objective lens for a used wavelength, and
m is a magnification of the objective lens.

2. An objective lens for recording and/or reproducing information of an optical information recording medium, comprising:
at least one aspherical surface;
wherein the objective lens is a single lens and satisfies the following formulas:

$0.80 < d/f < 3.00$ $0.47 < (X1-X2) \cdot (n-1)/(NA \cdot f \cdot \sqrt{(1+|m|)}) < 0.80$ $0.5 < \phi 1 < 5.8$ where
d is a thickness (mm) on an optical axis,
X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and it is assumed that X1 takes a positive sign when it is measured in the direction toward the optical information recording medium from the tangent plane that serves as a reference point, and it takes a negative sign when it is measured in the direction toward the light source, X2 is a difference (mm) in the direction of an optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and it is assumed that X2 takes a positive sign when it is measured in the direction toward the optical information recording medium from the tangent plane that serves as a reference point, and it takes a negative sign when it is measured in the direction toward the light source, n is a refractive index of the objective lens for a used wavelength, f is a focal length (mm) of the objective lens for an object located at an infinite distance, m is a magnification of the objective lens, and $\phi 1$ is an effective diameter (mm) of a light source side surface.

3. The objective lens of claim 2, wherein the value of the optical information recording medium side numerical aperture NA satisfies the following formula:

$$0.70 < NA < 0.98.$$

4. An objective lens for recording and/or reproducing information of an optical information recording medium in an optical pickup apparatus having a light source of a wavelength $\lambda$, comprising;
at least one aspherical surface;
wherein the objective lens is a single lens and satisfies the following formulas:

$$0.85 < NA < 0.98$$

$$350 \text{ nm} < \lambda < 550 \text{ nm}$$

$$0.40 < (X1-X2)\cdot(n-1)/(NA\cdot f\cdot \sqrt{(1+|m|)}) < 0.80$$

where NA is an optical information recording medium side numerical aperture,

X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and it is assumed that X1 takes a positive sign when it is measured in the direction toward the optical information recording medium from the tangent plane that serves as a reference point, and it takes a negative sign when it is measured in the direction toward the light source, X2 is a difference (mm) in the direction of an optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and it is assumed that X2 takes a positive sign when it is measured in the direction toward the optical information recording medium from the tangent plane that serves as a reference point, and it takes a negative sign when it is measured in the direction toward the light source, n is a refractive index of the objective lens at the wavelength $\lambda$, f is a focal length (mm) of the objective lens for an object located at an infinite distance, and m is a magnification of the objective lens.

5. The objective lens of claim 4, wherein the following formulas are satisfied.

$$0.80 < d/f < 3.00$$

$$0.5 < \phi 1 < 5.8$$

where
d is a thickness (mm) on an optical axis
$\phi 1$ is an effective diameter (mm) of a light source side surface.

6. An objective lens for recording and/or reproducing information of an optical information recording medium, comprising:
at least one aspherical surface; and
a ring-shaped diffractive structure on at least one surface thereof,
wherein the objective lens is a single lens and satisfies the following formulas:

$$0.85 < NA < 0.98$$

$$0.95 < d/f < 3.00$$

$$0.40 < (X1-X2)\cdot(n-1)/(NA\cdot f\cdot \sqrt{(1+|m|)}) < 0.80$$

where
NA is an optical information recording medium side numerical aperture,
d is a thickness (mm) on an optical axis,
f is a focal length (mm) for an object located at an infinite distance,
X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and it is assumed that X1 takes a positive sign when it is measured in the direction toward the optical information recording medium from the tangent plane that serves as a reference point, and it takes a negative sign when it is measured in the direction toward the light source, X2 is a difference (mm) in the direction of an optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and it is assumed that X2 takes a positive sign when it is measured in the direction toward the optical information recording medium from the tangent plane that serves as a reference point, and it takes a negative sign when it is measured in the direction toward the light source, n is a refractive index of the objective lens for a used wavelength, and m is a magnification of the objective lens.

7. The objective lens of claim 6, wherein the objective lens is used for an optical pickup apparatus of a wavelength λ and satisfies the following formulas:

350 nm>λ>550 nm 0.5<φ1<5.8 where φ1 is an effective diameter (mm) of a light source side surface.

8. An objective lens for recording and/or reproducing information of an optical information recording medium in an optical pickup apparatus having a light source of a wavelength λ, comprising:

at least one aspherical surface; and a ring-shaped diffractive structure on at least one surface;

wherein the objective lens is a single lens and satisfies the following formulas:

0.85<NA<0.98

350 nm<λ<550 nm 0.40<(X1−X2)·(n−1)/(NA·f·√(1+|m|))<0.80 where NA is an optical information recording medium side numerical aperture,

X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and it is assumed that X1 takes a positive sign when it is measured in the direction toward the optical information recording medium from the tangent plane that serves as a reference point, and it takes a negative sign when it is measured in the direction toward the light source, X2 is a difference (mm) in the direction of an optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and it is assumed that X2 takes a positive sign when it is measured in the direction toward the optical information recording medium from the tangent plane that serves as a reference point, and it takes a negative sign when it is measured in the direction toward the light source, n is a refractive index of the objective lens at the wavelength λ, f is a focal length (mm) of the objective lens for an object located at an infinite distance, and m is a magnification of the objective lens.

9. The objective lens of claim 8, wherein the following formulas are satisfied, 0.80<d/f<3.00

0.5<φ1<5.8 where d is a thickness (mm) on an optical axis,

φ1 is an effective diameter (mm) of a light source side surface.

10. The objective lens of any one of claims 1, 4, 6 and 8, wherein the following formula is satisfied, 0.47<(X1−X2)·(n−1)/(NA·f·√(1+|m|))<0.75.

11. An objective lens for recording and/or reproducing information of an optical information recording medium, comprising:

at least one aspherical surface;

wherein the objective lens is a single lens and satisfies the following formulas:

0.70<NA<0.98

0.80<d/f<1.35

0.35<(X1−X2)·(n−1)/(NA·f·√(1+|m|))<0.70 where

NA is an optical information recording medium side numerical aperture, d is a thickness (mm) on an optical axis, f is a focal length (mm) for an object located at an infinite distance, X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and it is assumed that X1 takes a positive sign when it is measured in the direction toward the optical information recording medium from the tangent plane that serves as a reference point, and it takes a negative sign when it is measured in the direction toward the light source, X2 is a difference (mm) in the direction of an optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and it is assumed that X2 takes a positive sign when it is measured in the direction toward the optical information recording medium from the tangent plane that serves as a reference point, and it takes a negative sign when it is measured in the direction toward the light source, n is a refractive index of the objective lens for a used wavelength, and m is a magnification of the objective lens.

12. The objective lens of claim 11, wherein the following formula is satisfied, 0.40<(X1−X2)·(n−1)/(NA·f·√(1+|m|))<0.65.

13. The objective lens of claim 11, wherein the objective lens is used for an optical pickup apparatus of a wavelength λ and satisfies the following formula:

350 nm<λ<550 nm.

14. The objective lens of any one of claims 1, 4, 6, 8, and 11, wherein the objective lens is a bi-aspherical single lens.

15. The objective lens of any one of claims 1, 4, 6, 8, and 11, wherein the following formula is satisfied:

$$0.25 < r1/n \cdot f(1-|m|)) < 0.65$$

where
- r1 is a paraxial radius (mm) of curvature of a light source side surface,
- n is a refractive index of the objective lens for a used wavelength, and
- m is a magnification of the objective lens.

16. The objective lens of any one of claims 1, 4, 6, 8, and 11, wherein the objective lens is corrected to an aspherical aberration correspond to a thickness of a protective layer to protect an information recording plane of the optical information recording medium and satisfies the following formula:

$$0.0 \leq t\ 0.15$$

where t is the thickness of the protective layer.

17. The objective lens of any one of claims 1, 4, 6, 8, and 11, wherein the objective lens is a plastic lens.

18. The objective lens of any one of claims 1, 4, 6, 8, and 11, wherein the objective lens is a glass lens.

19. An optical pickup apparatus for conducting recording and/or reproducing information for an optical information recording medium, comprising:
- a light source; and
- a converging optical system including an objective lens to converge a light flux emitted from the light source onto an information recording plane of the optical information recording medium;
- wherein the optical pickup apparatus conducts recording and/or reproducing information for the optical information recording medium by detecting light reflected from the information recording plane, and
- wherein as the objective lens, the converging optical system includes the objective lens described in any one of claims 1, 4, 6, 8 and 11.

20. A voice and/or image recording and/or voice and/or image reproducing apparatus, comprising:
the optical pickup apparatus described in claim 19.

* * * * *